United States Patent [19]

Membrino et al.

[11] 4,120,028
[45] Oct. 10, 1978

[54] DIGITAL DISPLAY DATA PROCESSOR

[75] Inventors: Robert J. Membrino; John C. Gaughan, both of Silver Spring, Md.

[73] Assignee: The Singer Company, Binghamton, N.Y.

[21] Appl. No.: 734,660

[22] Filed: Oct. 21, 1976

[51] Int. Cl.² .............................................. G06F 3/14
[52] U.S. Cl. .................................................... 364/200
[58] Field of Search ..................... 340/324 A, 324 AD; 364/200 MS File, 900 MS File; 35/6

[56] References Cited

U.S. PATENT DOCUMENTS

| | | | |
|---|---|---|---|
| 3,379,833 | 4/1968 | Hecker et al. | 340/324 AD X |
| 3,418,459 | 12/1968 | Purdy et al. | 340/324 A X |
| 3,422,419 | 1/1969 | Matthews et al. | 340/324 A |
| 3,534,338 | 10/1970 | Christensen et al. | 364/200 |
| 3,659,283 | 4/1972 | Ophir | 340/324 AD |
| 3,696,392 | 10/1972 | Fossum | 340/324 |
| 3,854,124 | 10/1974 | Comstock et al. | 364/200 |
| 3,872,461 | 3/1975 | Jarosik et al. | 340/324 AD |
| 3,895,357 | 7/1975 | Schwartz et al. | 364/200 |
| 3,964,365 | 3/1976 | Bantner | 364/200 |
| 3,996,584 | 12/1976 | Plager | 340/324 AD |

Primary Examiner—Harvey E. Springborn
Attorney, Agent, or Firm—Ronald Reichman; Jeff Rothenberg

[57] ABSTRACT

This invention relates to an electronic processing system that receives instruction and data words from a digital computer and automatically processes the instruction and data words to control the appearance of graphical and written matter on a plurality of display devices. The foregoing is accomplished by storing the instruction and data words in a first-in-first-out memory, decoding the formatted instruction word received from the first-in-first-out memory and routing the data that immediately follows the instruction words to the character and function generators so that the desired information may appear on the screens of the display devices. Thus, this invention reduces the number of computer instructions that are necessary to produce a given set of elements on the display devices so that an additional computer would not be required.

12 Claims, 14 Drawing Figures

| FIG. 2I | FIG. 2J | FIG. 2K | FIG. 2L |
|---|---|---|---|
| FIG. 2H | FIG. 2G | FIG. 2F | FIG. 2E |
| FIG. 2A | FIG. 2B | FIG. 2C | FIG. 2D |

FIG. 2

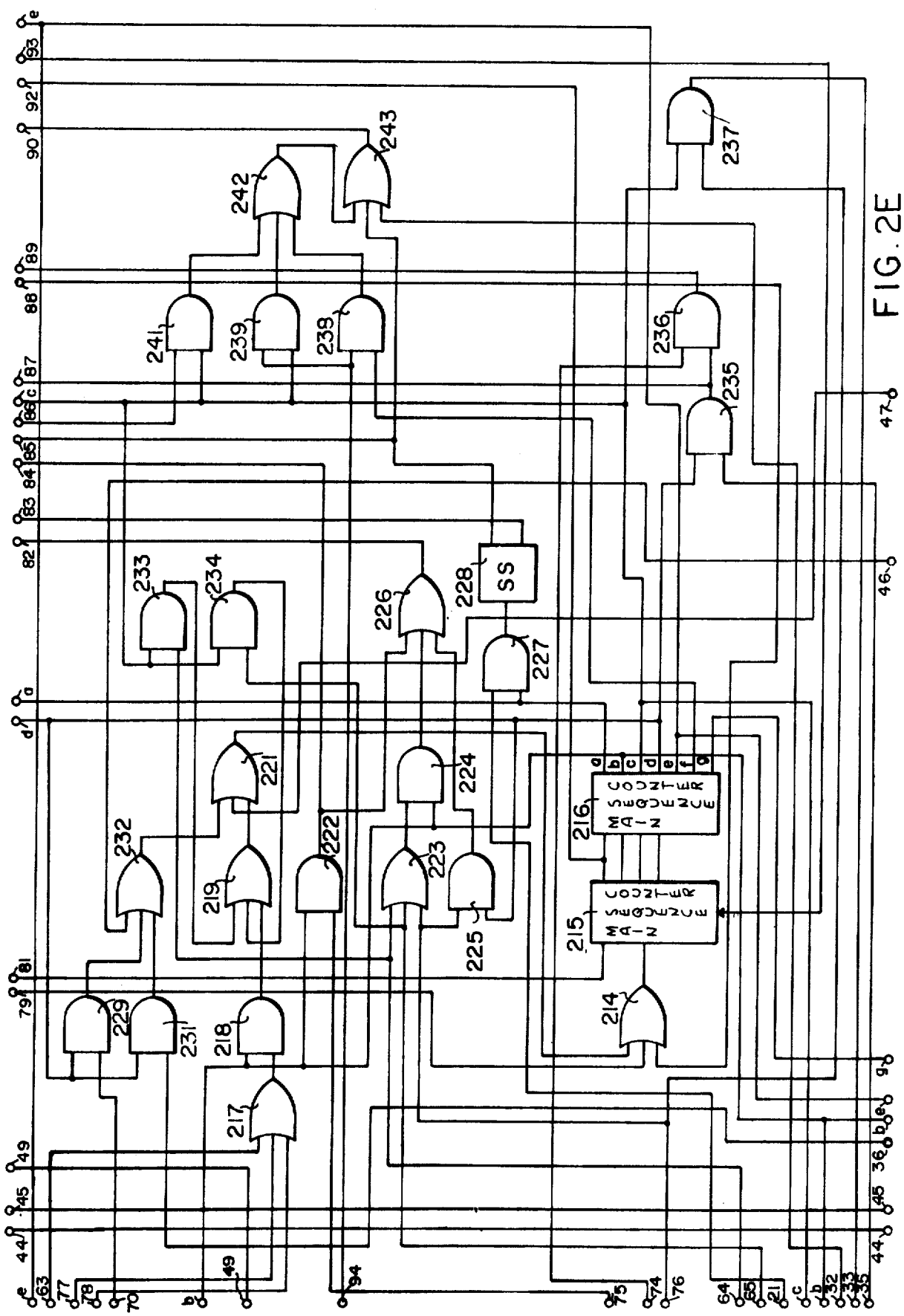

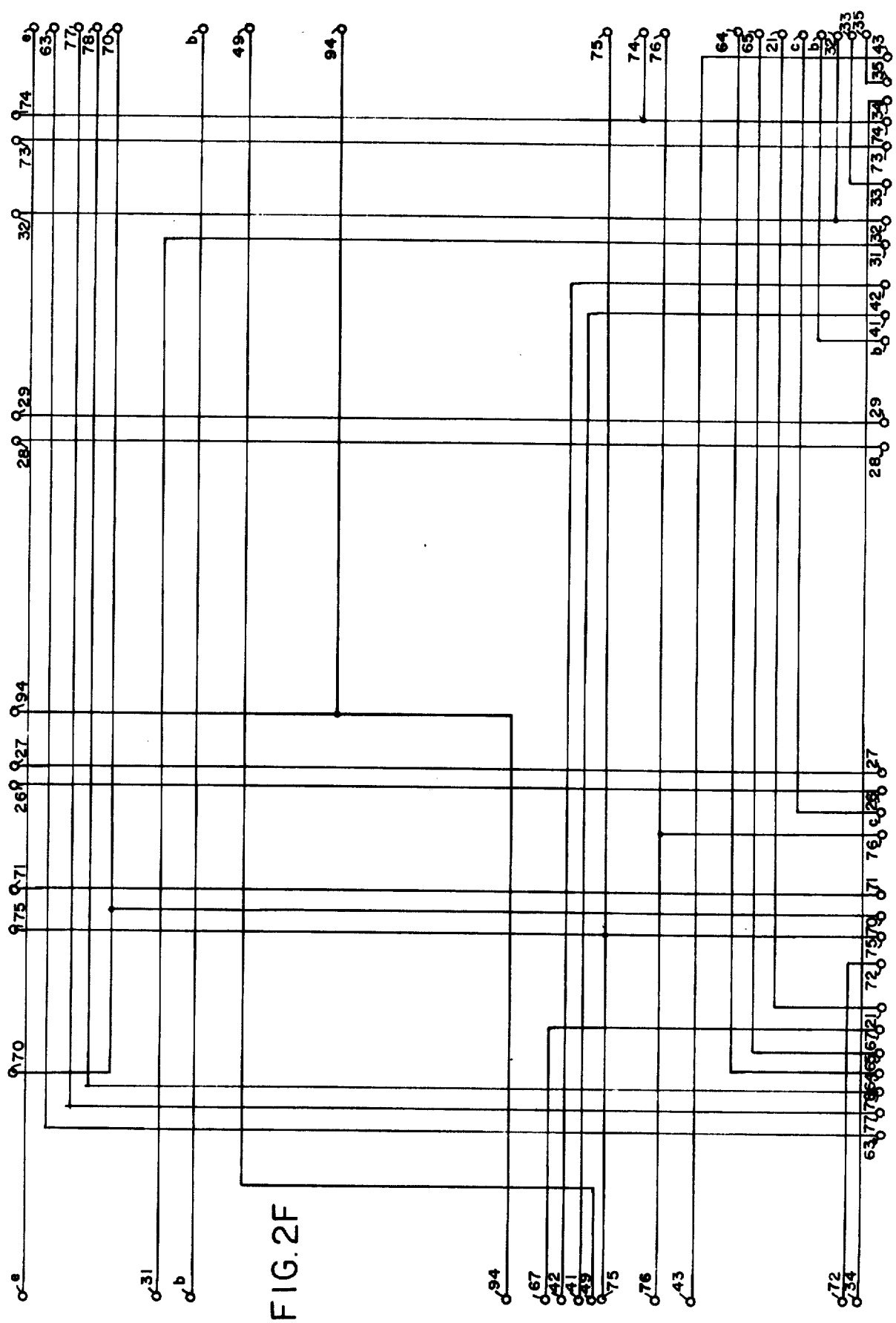

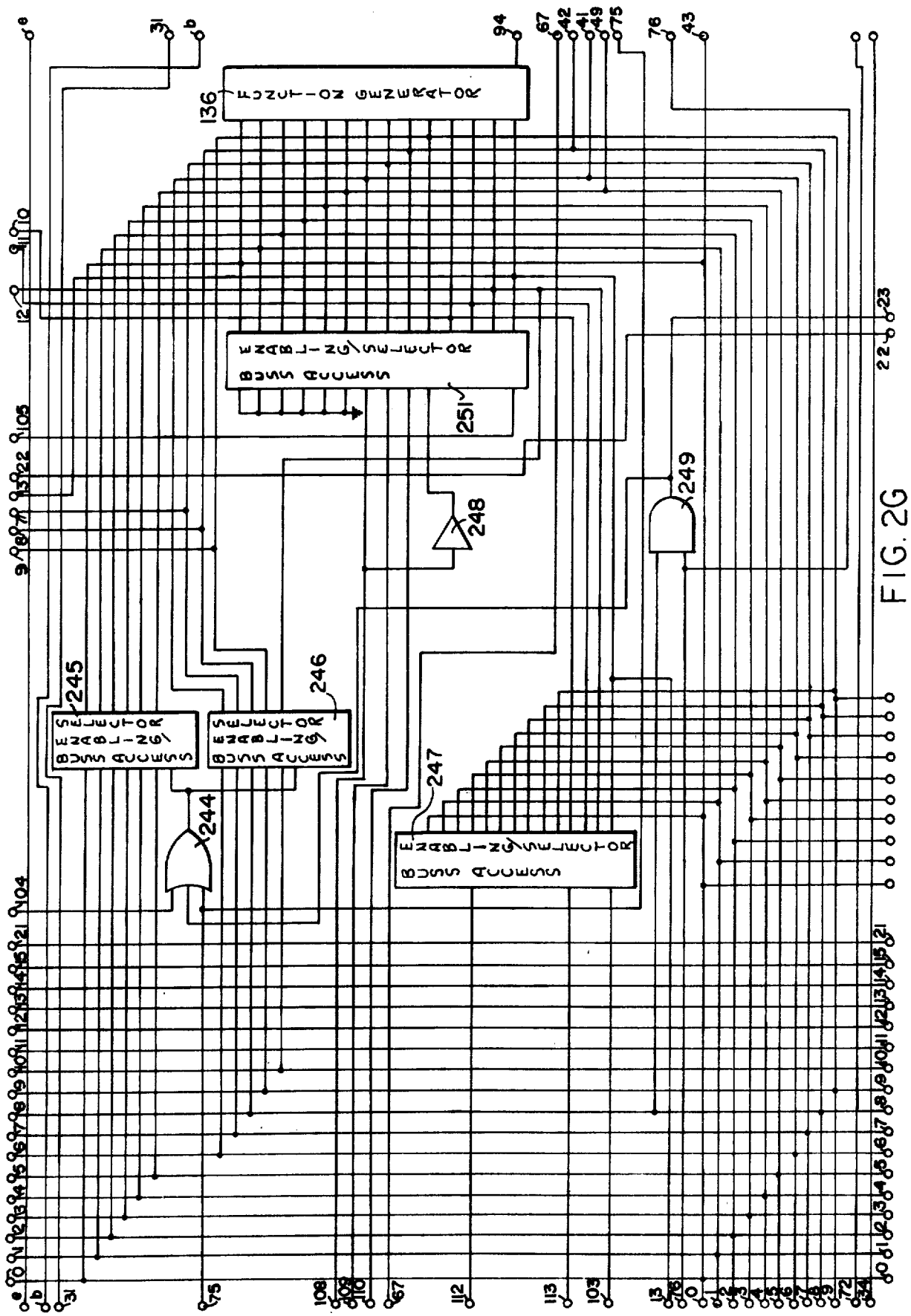

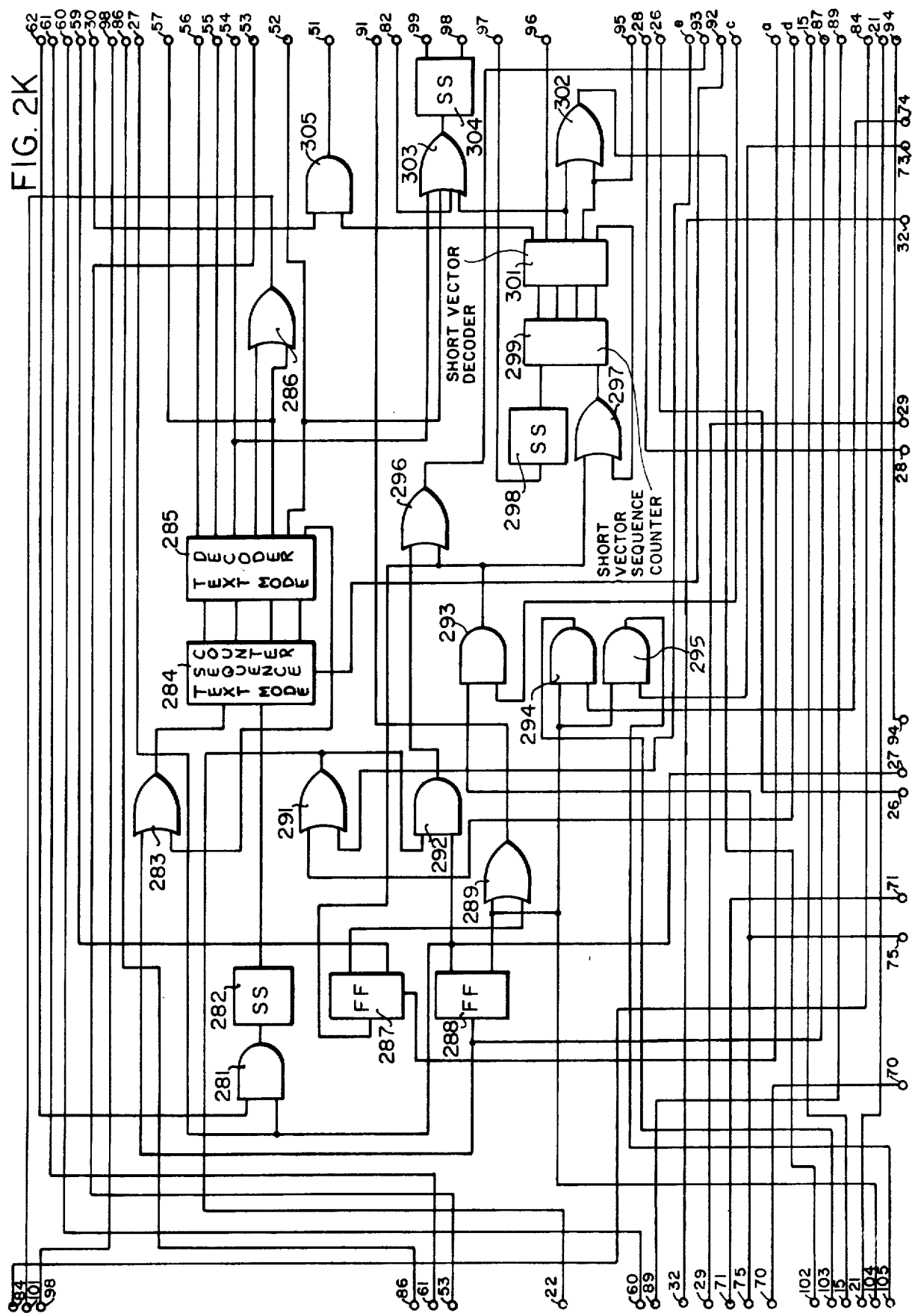

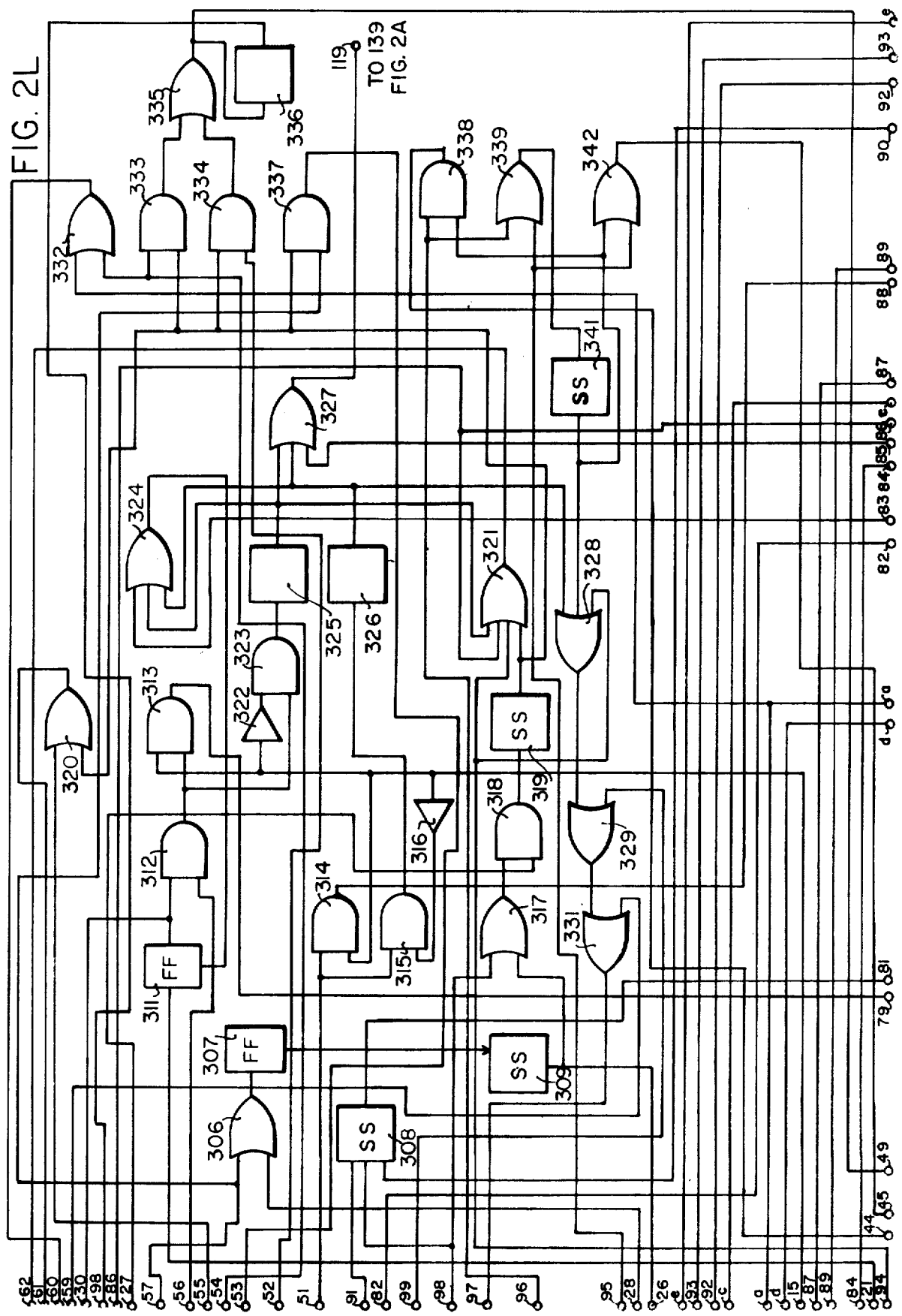

DIGITAL DISPLAY DATA PROCESSOR

BACKGROUND OF THE INVENTION

1. Field of the Invention

This invention relates to electronic circuits and, more particularly, to display processing devices that establish electrical compatibility between a general purpose digital computer memory channel and display equipment.

2. Description of the Prior Art

The industrial revolution was based on the transformation and transmission of energy; the computer is based on the transformation and transmission of information. Mechanical devices developed during the industrial revolution determined the amount and type of physical labor performed by man. Because of the computer's high speed and high precision, it is used to solve many of man's computational problems and thus it is responsible for finding solutions to many of the mental activities that were heretofore performed by man.

Digital computers vary widely in size, speed and type of construction, but practically all digital computers are comprised of the following main parts: one or more devices for entering digital data; a storage or memory unit for temporarily storing the data as it is entered and for storing both the intermediate and final results of the computations; an arithmetic unit for performing the computations; one or more output devices for recording the results of the computations; and a control unit for causing the computer to proceed through the problem by executing the appropriate sequence of arithmetic operations.

The information contained within the digital computer is in the form of electrical signals that are indistinguishable to man without the use of specialized equipment that puts the signals in a form that will be recognized by man. After processing the electrical signals contained within the digital computer, the computer will have a series of electrical signals that represent the answer to some problem. The electrical signals may be transmitted to character and function generators, said character and function generators being coupled to output devices. The character and function generators convert the electrical signals received from the computer to certain analog deflection voltages that are used to drive certain output devices, i.e., cathode ray tubes (CRT), chart recorders, etc. The character generator is used to produce alphanumeric characters and the function generator is used to produce pictorial displays. A display generator (character and function generator) is coupled to one or more display devices (CRTs). As the number of display devices and display generators increases, the number of computer instructions required to produce a specified amount of information on the screen of a CRT increases. Thus, there is an increase in the amount of computer memory that must be used to control the display devices. An increase in the number of display devices also causes an increase in the amount of computer memory that must be devoted to compensate for differences in the rate of flow of information in the computer and in the display generators, and the interval of time required for the computer's direct memory access channel to transmit information to a given display is likewise increased. Therefore, in order to accommodate many display devices, it is necessary to use larger and more expensive computers or many small computers.

SUMMARY OF THE INVENTION

This invention overcomes the disadvantages of the prior art by providing a system that is capable of driving a large number of display generators (character and function generators) with a single general purpose digital computer. By using the apparatus of this invention, it is possible to reduce the number of computer instructions that are required to produce certain information on a given CRT, thus reducing the cost of the system because it is no longer necessary to purchase a larger, more expensive computer or many smaller computers to display information on many CRTs.

A large number of CRTs is often used as output devices of many types of training simulators; for instance, simulators that are used to train students in the use and operation of radar and sonar equipment. Training simulators have been developed to teach students how to use and operate various types of equipment without undergoing the dangers that are inherent in the equipment's actual operation. It is a great deal safer for a student to learn how to use and operate a radar or sonar device by training on his own simulated radar or sonar display in a simulated environment than in the real-world. Thus, by adding CRTs to the simulator, many students may be trained at the same time under test conditions and be exposed to the same or different emergencies that are likely to occur in the actual operation of the equipment.

It is an object of this invention to provide a new and improved electrical system for driving display generators.

It is another object of this invention to provide a new and improved electrical system that processes data quickly for driving display generators.

It is a further object of this invention to provide a new and improved electrical system for driving display generators with one digital computer.

Other objects and advantages of this invention will become apparent as the following description proceeds, which description should be considered together with the accompanying drawings.

BRIEF DESCRIPTION OF THE DRAWINGS

FIG. 2 is a matrix showing how FIGS. 2A-2L are assembled to form a complete drawing.

FIGS. 2A-2L are logic diagrams of the electrical system that comprises this invention.

DESCRIPTION OF A PREFERRED EMBODIMENT

Figure 1:
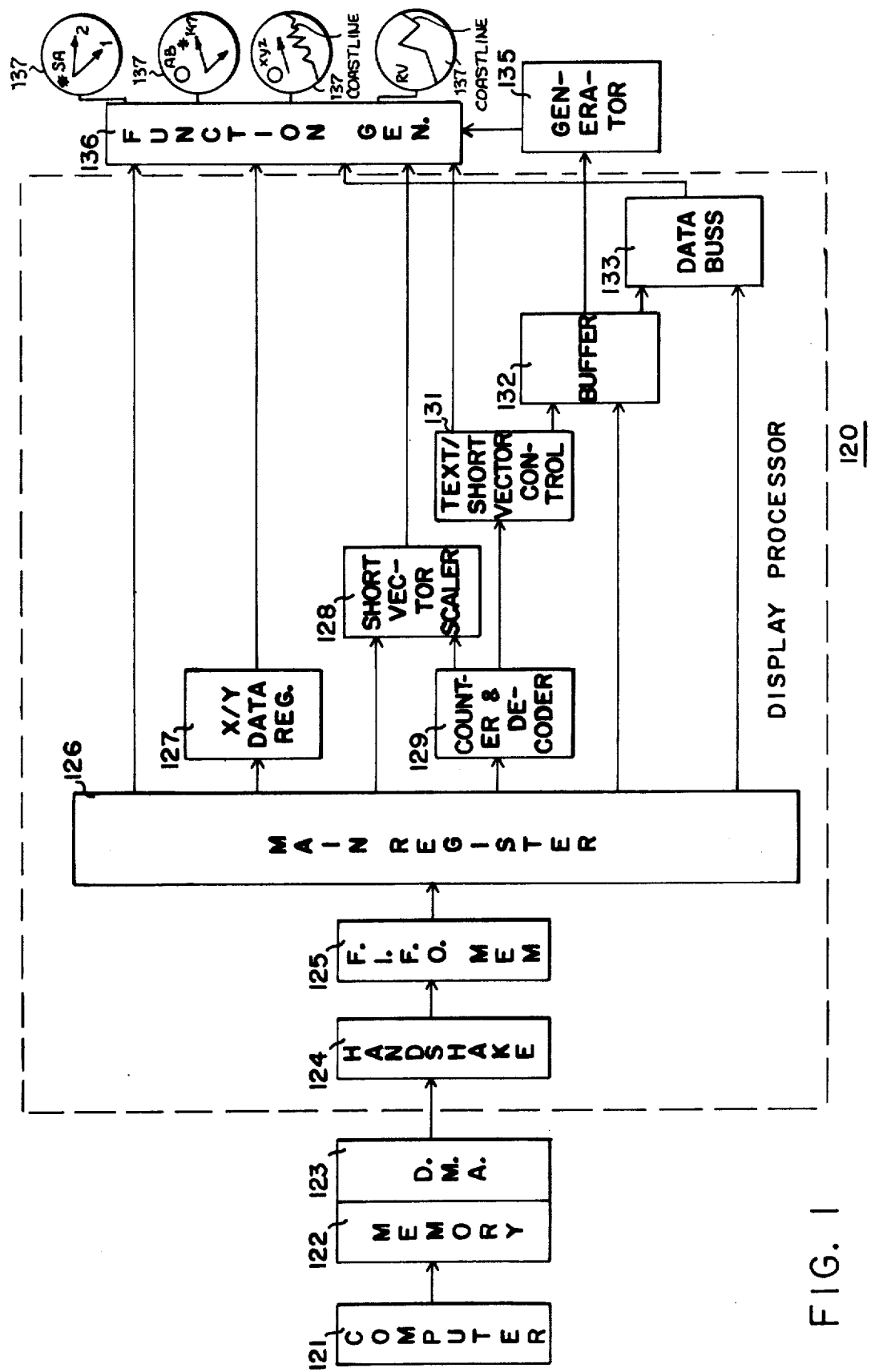
FIG. 1 is an overall block diagram of the system that comprises this invention.

Referring now to the drawings in detail and, more particularly, to FIG. 1, the reference character 121 represents a general purpose digital computer having an external memory 122 which has a direct memory access channel 123. Direct memory access channel 123 is coupled to a handshake control 124 which is coupled to FIFO (first-in-first-out) memory 125.

Computer 121 develops data that will be used for simulating the position of various ships and other objects normally found at sea. The data that is developed by computer 121 is stored in memory 122, permitting direct memory access channel 123 and handshake control 124 to directly extract the data stored in memory 122. In order to accomplish the foregoing, handshake control 124 must by synchronous and electrically compatible with direct memory access channel 123. The data extracted from memory 122 is temporarily stored in FIFO memory 125. FIFO memory 125 is operated asynchronously with respect to computer 121, thus permitting the acquisition of a backlog so that the balance of the system hereinafter described will always have data when it wants it and not have to waste time in requesting data from computer 121. Hence, the foregoing permits a more efficient use of the computer's time.

Main register 126 is coupled to FIFO memory 125, main sequence counter 129, X/Y data register 127, short vector scaler 128, character generator buffer 132 and function generator data buss 133. Text-short vector control 131 is coupled to main sequence counter 129 and character generator buffer 132.

The act of removing data from FIFO memory 125 and storing the data in main register 126 starts main sequence counter 129. The data that is currently stored in main register 126 is the data that the remainder of this system is currently processing. Main sequence counter 129 sequences the various steps required to decode and process the data stored in register 126. Therefore, the first step in each cycle of the sequence counter is to remove a new word from FIFO memory 125.

The X/Y data register 127 consists of a plurality of registers that are used to decode part of the data word stored in register 126 and determine the X and Y coordinates of the vector that is going to be drawn on the displays. The displays may be cathode ray tubes or any other suitable device.

The short vector scaler 128 decodes that part of the data word stored in register 126 that represents the end coordinates of a vector relative to a previously defined point. Thus, the short vector scaler 128 will determine the construction of a vector string on a head-to-tail basis and will route this data to function generator 136 (hereinafter described) at the appropriate time.

Character generator buffer 132 contains electrical circuitry that will establish electrical and timing compatibility between the data word stored in register 138 (FIG. 2A) and the circuitry of the character generator hereinafter described.

The function generator data buss 133 is responsible for coordinating the data that is received from the various subsystems of this invention and multiplexing this data into a common data buss.

The text vector control 131 contains two sequence counters, one of which is used in conjunction with main sequence counter 129 to draw alphanumeric characters next to the vector head on the displays, and the other sequence counter is used in conjunction with the main sequence counter 129 to draw a given image (such as a coast line) at a different magnification (i.e., range scale) of the displays.

The data inputs of function generator 136 come from main register 126, (some of this data is address information that determines which one of displays 137 that the data being displayed should be processed on) X/Y data register 127, short vector scaler 128, text/short vector control 131 and function generator buss 133. Character generator buffer 132 is coupled to character generator 135, which is coupled to conical function generator 136, and a plurality of displays 137 are coupled to the output of function generator 136. In the following description the terms CRT's and displays refers to stroke writing CRT's.

The electrical and timing compatibility between the display processor 120 and the computer 121 is accomplished by utilizing the function generator 136, handshake 124, FIFO memory 125, main register 126, X/Y data register 127, main sequence counter 129, short vector scaler 128, text/short vector control 131, character buffer 132, function generator data buss 133 and the display generator system consisting of function generator 136, character generator 135 and displays 137.

A plurality of displays 137 which may be CRTs have alphanumeric characters and certain geometric shapes drawn on the screen of the CRTs by the character and function generators. The apparatus of this invention, i.e., display processor 120, has certain advantages over the display processors disclosed by the prior art. The advantages of display processor 120 are that it has the ability to use a previously defined display coordinate as the initial reference point for display instructions (e.g., several radical lines originating at the same point or several concentric circles), draw any desired set of symbols and characters in a previously defined format, and the ability to scale certain vector and position data by any of several binary functions.

Figure 2A:
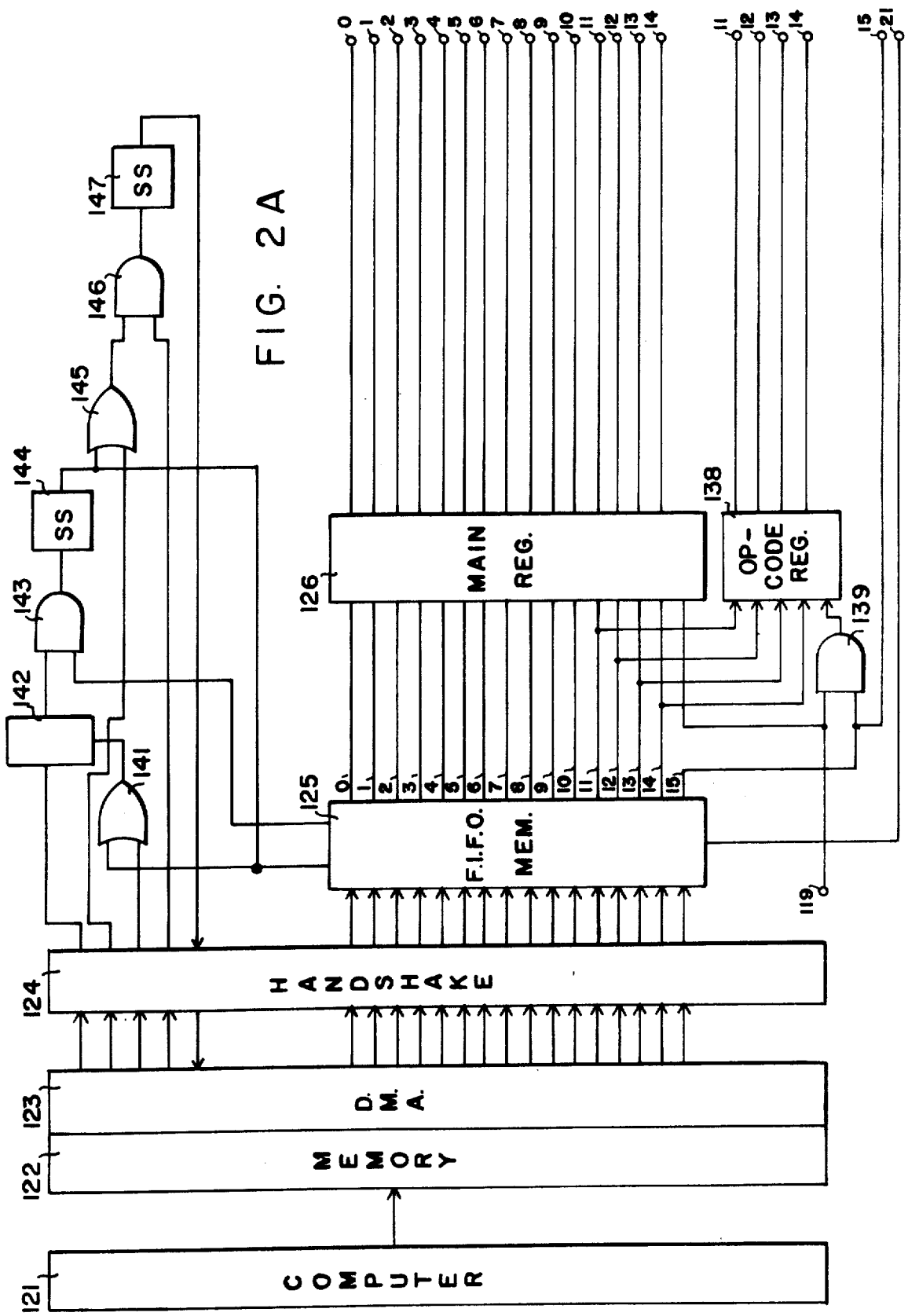

FIGS. 2A through 2L are logic diagrams of the electrical system which comprises this invention, with FIG. 2 being a matrix showing the interconnection of FIGS. 2A-2L. Appearing on FIG. 2A is a digital computer 121 having an external memory 122 and a direct memory access channel 123. Handshake control 124 is coupled to direct memory access channel 123 and the remainder of this invention. Handshake control 124 establishes electrical compatibility between channel 123 and the remainder of this invention. Sixteen parallel data lines representing data bit 0 through data bit 15 are connected between channel 123 and control 124. The data being transmitted from channel 123 to control 124, data bits 0-15, represent one data word. Five parallel control lines determine the manner in which data is entered into FIFO memory 125. Sixteen parallel data lines representing data bits 0-15 are connected between control 124 and FIFO memory 125, the data being transmitted from control 124 to memory 125. FIFO memory 125 is capable of storing 64 16-bit words. Thus, memory 125 allows the transfer of data between channel 124 and the display processor 120 to be asynchronous, permitting memory 125 to build up a surplus of data words so that a plurality of output devices may be serviced by one computer. Memory 125 provides for a more efficient use of the time of computer 121 since the time required to build up and remove data words from FIFO memory 125 is shorter than the time required to request and obtain data words from computer 121.

The input of flip flop 142 is coupled to control 124 and the output of flip flop 142 is one of the inputs of AND gate 143. The other input of AND gate 143 is connected to memory 125. The input of single shot 144 is connected to the output of gate 143, and the output of single shot 144 is connected to one of the inputs of OR gate 145, memory 125, and one of the two inputs of coincidence gate 141. The other input of gate 141 comes from control 124. The output of gate 141 is connected to flip flop 142. AND gate 146 receives one of its two inputs from the output of gate 145 and the other input from control 124. Single shot 147 is connected to the output of gate 146 and control 124.

DMA channel 123 is controlled by computer 121 and the computer determines when it is time to update the display processor. Computer 121 sets up its own internal workings as to data transfer. When the computer is ready to transfer data words via lines 0-15, a positive pulse is sent to gate 145 and gate 146 via the five control lines, causing OR gate 145 to be enabled, which will cause AND gate 146 to be enabled if a ready signal from channel 123 is received by gate 146. Thereupon, single shot 147 is triggered and a signal called a cycle request is sent to channel 123 so that the computer will be informed that the processor 120 (shown in FIG. 1) is ready to receive data. The electronics of this invention is such that the processor will always be ready to receive data. Valid data will then be put on lines 0–15. After each data word is sent, a signal called an end-of-cycle will be sent to flip flop 142 where the signal is stored, and a positive signal is sent to gate 143. If memory 125 is ready to receive data, a strobe is sent from memory 125 to gate 143 and, if the positive signal is present from register 142, gate 143 will be enabled and single shot 144 will be fired. The leading edge of the output signal of single shot 144 causes FIFO memory 125 to load data and the trailing edge of the output signal of single shot 144 goes through OR gate 145 and causes single shot 147 to be fired. The leading edge of the output signal of single shot 144 is also sent to OR gate 141 and the second input to OR gate 141 comes from channel 123. If either one of the above signals is present, OR gate 141 will be enabled, clearing flip flop 142. Flip flop 142 records the fact that data is on lines 0–15, and gate 143 records the fact that the FIFO memory 125 was ready to receive data. Additional data will be sent by channel 123 until computer 121 has no more data to transmit. The ready signal received by AND gate 146 from channel 123 will be low and single shot 147 will not be fired and a cycle request signal will not be sent to computer 121 and no additional data words will be transferred by the computer.

FIFO memory 125 is capable of storing a back-log of 64 data words when the first word is shifted from the left-hand side to the right-hand side of FIFO memory 125. A signal entitled new-data-ready is produced by memory 125 and that signal is transferred to single shot 147. The word that appears on lines 0–15 contains data bits 0–15 and is either an op-code, i.e., an instruction word that informs the processor how to handle the incoming data, or a data word. If data bit 15 is a one, that word is an op-code. Conversely, if data bit 15 is a zero, that word is a data word.

Main register 126 transmits data bits 0–14, and op-code register 138 transmits data bits 11–14. Data bit 15 is the first input of AND gate 139 and the second input of AND gate 139 is the output of OR gate 327 (FIG. 2L via line 119). The second input to AND gate 139 is also the clock input to main register 126.

Main register 126 and op-code register 138 are used to hold the computer word upon which the processor 120 (shown in FIG. 1) is currently acting on. Data bits 11 through 15 contain a code which defines the instruction that is going to be used to handle one or more data words. Data bits 0–10 contain the data that the instruction word processes.

After information has entered FIFO memory 125, a new-data-ready signal is generated by memory 125 and transmitted to flip flop 311 (FIG. 2L via line 21). The output of flip flop 311 is connected to one of the inputs of AND gate 227 (FIG. 2E via line 30), the other input of gate 227 is connected to that output of main sequence decoder 216 (FIG. 2E via line a) that corresponds to a count of the main sequence counter 215 equal to one. When the main sequence counter 215 is at one and memory 125 is transmitting a new-data-ready signal, it is time for the processor to start processing data.

The output of gate 227 (FIG. 2E) is connected to the input of a 100-NS delay 228, and one of the outputs of delay 228 is connected to one of the inputs of OR gate 243. The output of gate 243 via line 90 fires single shot 308 (FIG. 2L) and the output of single shot 308 causes main sequence counter 215 (FIG. 2E via line 81) to advance to a count of two. The output of delay 228 is also connected to one of the inputs of OR gate 324, and the output of gate 324 clears flip flop 311. Main sequence counter 215 has four outputs which are connected to main sequence decoder 216. During the time that the foregoing was accomplished, another output of delay 228 became one of the three inputs of OR gate 327 (FIG. 2L via line 85). The output of gate 327 is connected to the clock input of main register 126 (via line 119) causing data from memory 125 to be entered into main register 126. If the pulse coming from gate 327 is a one and bit 15 is a one, there will be a new op-code entered into op-code register 138, which code is determined by data bits 11 through 14. However, if gate 139 is not enabled, the processor will process the current data word in the same manner as it processed the previous data word.

When the main sequence counter 215 (FIG. 2E) is at a count of two or above, the logic that will process the data word will be determined by the code that is contained with op-code register 128. The following chart depicts which processes this system will perform in various op-codes and at various counts of the main sequence counter.

| | MAIN SEQUENCE COUNTER COUNT | | | | | | |
|---|---|---|---|---|---|---|---|
| Op-Code | Count 1 | Count 2 | Count 3 | Count 4 | Count 5 | Count 6 | Count 7 |
| | This step is independent of op-code | | | | | | |
| 0 | Load new FIFO word | Preset shift register | | | | | |
| 1 | Load new FIFO word | Load X register | Preset shift register | | | | |
| 2 | Load new FIFO word | Load Y register | Preset shift register | | | | |
| 3 | Load new FIFO word | Position X Strobe | Preset shift register | | | | |
| 4 | Load new FIFO word | Position Y Strobe | 3 function complete = 4 | Preset shift register | | | |
| 5 | Load new FIFO word | Position delta X Strobe | Preset shift register | | | | |
| 6 | Load new FIFO word | Position delta Y Strobe | 3 function complete = 4 | Preset shift register | | | |
| 7 | Load new FIFO word | Character address strobe | 3 character complete = 4 | Preset shift register | | | |

-continued

| | | | MAIN SEQUENCE COUNTER COUNT | | | | |
|---|---|---|---|---|---|---|---|
| Op-Code | Count 1 | Count 2 | Count 3 | Count 4 | Count 5 | Count 6 | Count 7 |
| 8 | Load new FIFO word | Character write strobe Position delta Y strobe jam intensity to 0 | 3 function complete = 4 | Preset shift register | | | |
| 9 | Load New FIFO word | Radius strobe | 3 function complete = 4 | Preset shift register | | | |
| 10 | Load new FIFO word | Position Y Strobe | 3 function complete = 4 | Delta (XY) text data on function buss. Remove main reg. from function buss. Set text sequence counter to 1. Set MR = 0. | | | |
| 11 | Load new FIFO word | Position Y Strobe | 3 function complete = 4 | Delta (XY) special text data on function buss. Remove main reg. from function buss. Set test sequence counter to 1. Jam size to 4. Set MR = 0. | | | |
| 12 | Load new FIFO word | Load scale on function buss. Remove main reg. from function buss. | Set short vector sequence counter to 1. Set MR = 0. | | | | |
| 13 | Load new FIFO word | Load status register | If P = 0 preset shift reg. If P = 1 position X data. Advance to 4 | Select Y data | Position Y | 6 function complete = 7 | Preset shift register |

The operations listed in the above chart will be more fully described as the description of this invention continues.

The four inputs of binary-to-decimal decoder 162 (FIG. 2C) are connected to the four outputs (bits 11-14) of op-code register 138. The output line of decoder 162 that represents an op-code equal to zero (via line 63) is connected to one of the three inputs of OR gate 217 (FIG. 2E) and the output of gate 217 is connected to one of the two inputs of AND gate 218. The other input of AND gate 218 is connected to the output line of decoder 216 that corresponds to a main sequence counter 215 count of two (line b). The output of gate 218 is connected to one of the three inputs of OR gate 219 whose output is connected to OR gate 221. The output of OR gate 221 is connected to one of the three inputs of OR gate 214 and the output of gate 214 is connected to counter 215 so that if OR gate 214 has a positive output, the main sequence counter 215 will be preset back to a count equal to one.

Thus, op-code zero causes the processor 120 (shown in FIG. 1) to obtain new data, the main sequence counter 215 (FIG. 2E) to advance to a count of two and be preset back to a count of one. An op-code equal to zero is called a no-op signal since all it does is prevent the system from hanging up by giving it something to do.

Figure 2B:
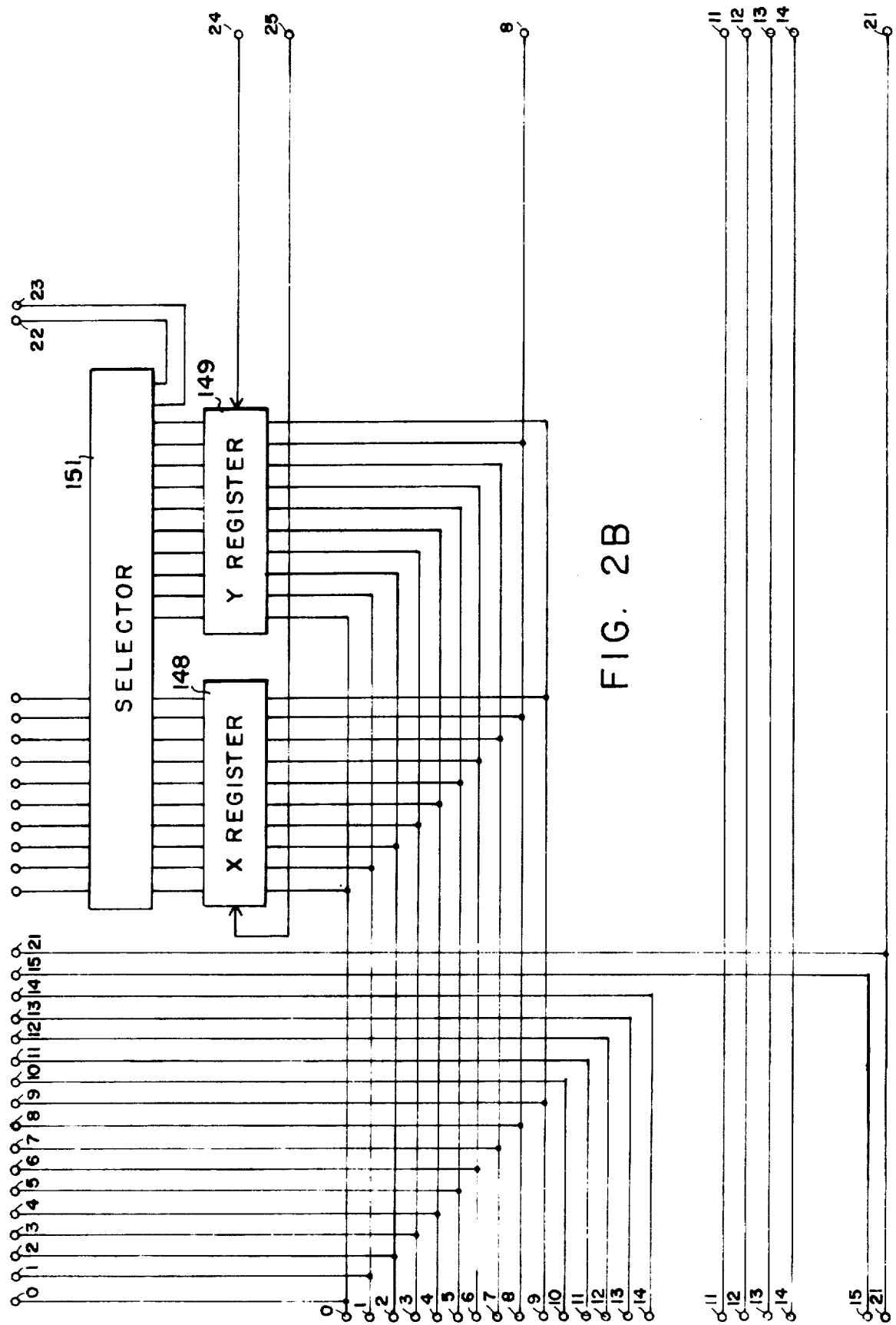
Figure 2C:
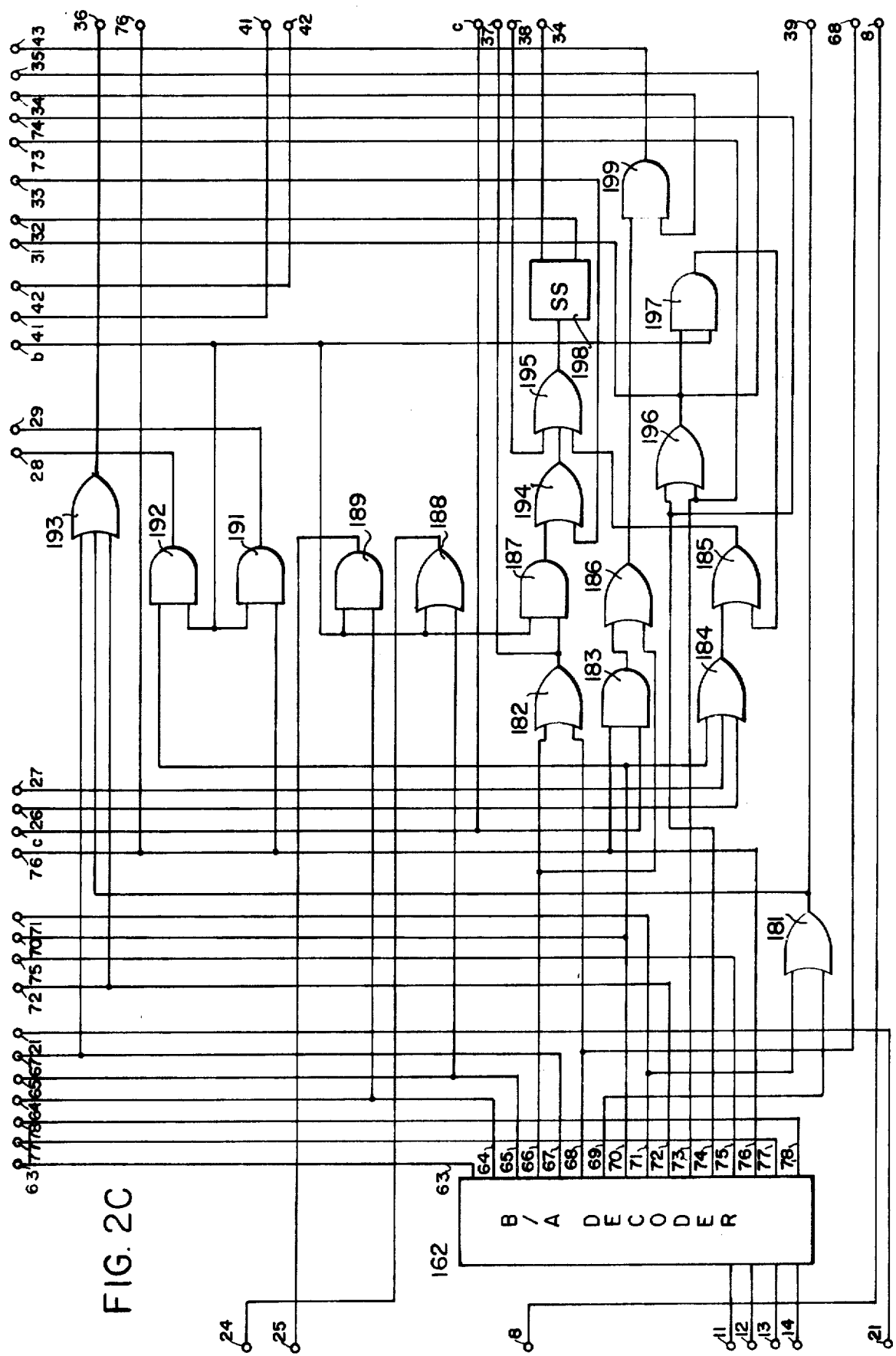

Referring to FIG. 2B, ten of the eleven inputs of X register 148 are connected to those output lines of main register 126 that contain bits 0-9 and the eleventh input to register 148 is a load input that comes from AND gate 189 (FIG. 2C via line 25). One of the inputs of AND gate 189 is connected to that output of binary-to-decimal decoder 162 that corresponds to an op-code equal to one (line 64), and the other input of AND gate 189 is connected to the output of that line of decoder 216 (FIG. 2E) that corresponds to a count of two (line b) on main sequence counter 215. Op-code 1 is also connected to one of the inputs of OR gate 223 (FIG. 2E via line 65). The output of gate 223 is the first input to AND gate 224 and the second input to gate 224 is connected to that line (line b) of decoder 216 that represents a count of two on main sequence counter 215. The output of AND gate 224 is connected to one of the two inputs of OR gate 226. The output of OR gate 226 is connected to one of the four inputs (via line 82) of OR gate 303 (FIG. 2K), and the output of OR gate 303 is connected to single shot 304. One of the two outputs of single shot 304 is connected to single shot 308 (FIG. 2L via line 98) and the output of single shot 308 is connected to main sequence counter 215 (FIG. 2E via line 81) so that the main sequence counter may be advanced to a count of three. Thus, during the foregoing sequence, data was loaded into X register 148 (FIG. 2B) from main register 126.

AND gate 233 (FIG. 2E) has two inputs, one of which is connected to that output of decoder 162 that corresponds to an op-code equal to 1 (line 64), and the other input is connected to that line of decoder 216 that represents a count of three (line c) on main sequence counter 215. The output of AND gate 233 is fed to OR gate 219 and the output of gate 219 is connected to OR gate 221. The output of OR gate 221 is one of the inputs of OR gate 214. The output of OR gate 214 is connected to main sequence counter 215 so that main sequence counter 215 may be set to a count equal to one. Since the main sequence counter 215 was set to a count equal to one, it will be ready to handle a new data word.

Let us assume that the new data word has an op-code equal to 2. A new word is loaded into main register 126 in the same manner heretofore described. The loading of a new word in main register 126 advances the main sequence counter 215 to a count equal to two. Ten of the eleven inputs of Y register 149 (FIG. 2B) are connected to those lines of main register 126 that contain bits 0-9, the eleventh input to register 149 being a load input that comes from OR gate 188 (FIG. 2C via line 24). One of the inputs of OR gate 188 is connected to the output of binary-to-decimal decoder 162 that corresponds to an op-code equal to 2 (line 65).

The ten output lines of register 148 are connected to the odd-numbered input lines of selector 151 and the ten output lines of register 149 are connected to the even-numbered inputs of selector 151. Selector 151 (FIG. 2B) has ten output lines that are connected to the first ten input lines of function generator 136 (FIG. 2G). OR gate 223 (FIG. 2E) is connected to that line (line 65) of decoder 162 corresponding to an op-code equal to 2. The output of OR gate 223 is connected to one of the two inputs of AND gate 224 and the second input of AND gate 224 is connected to that input of decoder 216 that equals a main sequence count of two (line b). The output of AND gate 224 is connected to OR gate 226, and the output of gate 226 is connected to OR gate 303 (FIG. 2K via line 82). The output of OR gate 303 is connected to single shot 304. One of the two outputs of single shot 304 is connected to single shot 308 (FIG. 2L). The output of single shot 308 is connected to the clock input of main sequence counter 215 (FIG. 2E via line 81) so that counter 215 may be advanced to a count of three.

AND gate 234 (FIG. 2E) has two inputs, one of which is connected to that output of decoder 162 corresponding to an op-code equal to 2 (line 65), and the other input is connected to that output of decoder 216 corresponding to a main sequence count equal to three (line c). The output of AND gate 234 is connected to OR gate 219, and the output of OR gate 219 is connected to one of the inputs of OR gate 221. The output of OR gate 221 is connected to OR gate 214, the output of which is connected to main sequence counter 215 so that the main sequence counter may be reset to a count of one.

Op-codes 1 and 2 are used to set the stored display coordinates which will be used as a reference point for certain display instructions hereinafter described.

Op-code 3 is the next op-code that is going to be described. It is used to obtain an absolute value of X from the computer and place this value of X into the function generator. As previously described, new data is loaded into main register 126.

One of the inputs of OR gate 182 (FIG. 2C) is connected to that output of decoder 162 that represents an op-code equal to 3 (line 66). The output of OR gate 182 is connected to one of the two inputs of AND gate 187, and the second input of AND gate 187 is connected to that output of decoder 216 representing a main sequence count equal to two (line b). An input to OR gate 194 comes from the output of OR gate 187. The output of OR gate 194 is coupled to OR gate 195, whose output fires single shot 198. Single shot 198 is used to generate a 500-NS pulse that is used as a general pulse for strobes going to the character generator hereinafter described. This pulse is then routed via the appropriate op-codes, which will be described as this description proceeds, to the appropriate lines going to the character generator.

The op-code 3 signal is also sent to OR gate 186 (via line 66), and the output of OR gate 186 is fed to one of the two inputs of AND gate 199 and the second input of gate 199 comes from one of the two outputs of single shot 198. The first of the fourteen inputs to function generator 136 (FIG. 2G via line 43) is connected to the output of AND gate 199. The output of single shot 198 is also used to advance main sequence counter 215 by having the output of single shot 198 connected to one of the inputs of OR gate 243 (FIG. 2E via line 32). The output of gate 243 is connected to the input of single shot 308 (FIG. 2L via line 90), and the output of single shot 308 is connected to the clock input of main sequence counter 215 via line 81.

Figure 2D:
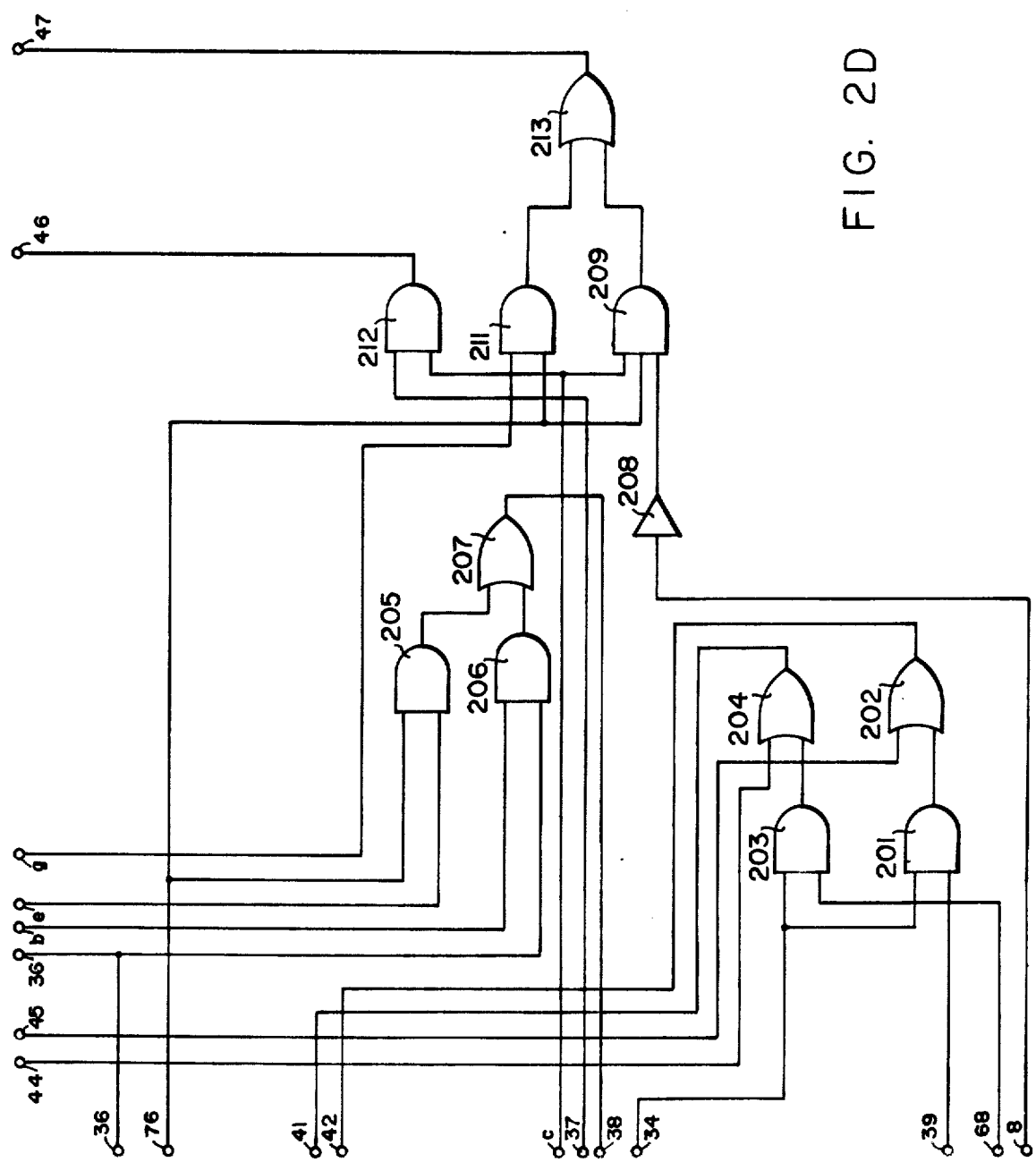

A count equal to three has now been reached on main sequence counter 215. One of the inputs of OR gate 182 (FIG. 2C) is connected to that output of decoder 162 corresponding to an op-code equal to 3 (line 66), and the output of OR gate 182 is connected to one of the two inputs of AND gate 212 (FIG. 2D via line 37). The second input of AND gate 212 is connected to that output of decoder 216 representing a count of three (line c) on main sequence counter 215. Once AND gate 212 is enabled, a positive signal is sent to one of the inputs of OR gate 232 (FIG. 2E via line 46). The output of OR gate 232 is connected to the input of OR gate 221, and the output of OR gate 221 is transmitted to OR gate 214. Main sequence counter 215 is coupled to the output of OR gate 214. Thus, if the output of OR gate 214 is a positive pulse, main sequence counter 215 will be reset to a count of one. The above description has indicated that the purpose of op-code 3 is to put X data on the data buss, i.e., the lines going to the function or character generators, and generates a position X strobe and begins processing the next word.

Op-code 4 has two purposes, the first of which is to load the Y data into the function generator and the second purpose is to cause the function generator to move the beam of the display device to that value of X that is in its X register and to that value of Y that is in its Y register at that particular time. Function generator 136 (FIG. 2G) is a one-step device. For instance, if the function generator is told to move to a new X,Y position or draw a line between two points or draw a circle with a certain radius from a defined center point, etc., a different instruction would be required for each different item that the function generator was required to perform. The electronics used during op-code 4 is as follows.

New data is brought up when main sequence counter 215 (FIG. 2E) has a count equal to one, the data is loaded into main register 126, and the op-code portion of the data is stored in register 138 and decoded by decoder 162. The decoded bits are op-code 4. Hence, a signal is sent to OR gate 254 (FIG. 2H) on that line (line 67) of decoder 162 representing an op-code equal to 4. The ouput of OR gate 254 is connected to one of the inputs of AND gate 255. The other input to AND gate 255 is connected to the output of single shot 198 (FIG. 2C via line 34), the firing of which is accomplished by op-code 4 going through OR gate 193 and AND gate 206 (FIG. 2D via line 36) where it is ANDed with a main sequence count equal to two (line b). The signal then goes to OR gate 207 and to OR gate 195 (FIG. 2C via line 38) before reaching single shot 198 and gate 255. The ouput of gate 255 (FIG. 2H) is connected to function generator 136 (via line 2). When gate 255 is enabled, a position Y strobe will be sent to the function generator. The function generator will draw the object that it was requested to draw and, when it is finished drawing, the function generator will transmit a signal called a function complete (via line 94) to AND gate 239 (FIG. 2E). The two inputs to AND gate 239 come from function generator 136 and that output of decoder 216 corresponding to a main sequence count equal to three (line c). The output of gate 239 is connected to OR gate 242, and the output of gate 242 is connected to OR gate 243, whose output is connected to the input of single shot 308 (FIG. 2L via line 90). The output of single shot 308 is connected to the clock input of counter 215 (FIG. 2E via line 81). Hence, the firing of single shot 308 will cause the main sequence counter to advance to a count of four. That output line of decoder 216 representing a count of four (line d) on main sequence counter 215 is connected to one of the inputs of AND gate 231, the other input to AND gate 231 coming from the output of OR gate 193 (FIG. 2C via line 36). One of the three inputs to OR gate 193 is connected to that output line of decoder 162 that represents an op-code equal to 4 (line 67). The output of gate 231 (FIG. 2E) is connected to OR gate 232, and the output of gate 232 is connected to OR gate 221. The output of OR gate 221 is connected to the input of OR gate 214, and the output of OR gate 214 is connected to main sequence counter 215 so that counter 215 may be reset and wait for new data once gate 214 is enabled.

Op-code 5 performs a position delta X function, and op-code 6 performs a position delta Y function. Main sequence counter 215 is at a count of one and new data having op-code 5 is loaded into FIFO memory 125. The fact that new data was brought up advances the main sequence counter 215 to a count of two. Op-code 5 is decoded by decoder 162 and is then transmitted to OR gate 182 (FIG. 2C via line 68). The output of OR gate 182 is one of the two inputs to AND gate 187, the second input of AND gate 187 being connected to that output line of decoder 216 which represents a main sequence count of two (line b). The output of gate 187 is sent to single shot 198 via OR gate 194 and OR gate 195. AND gate 203 (FIG. 2D) has two inputs, one of which is the output of single shot 198 (via line 34), and the second input is connected to that output line of decoder 162 representing op-code 5 (line 68). The output of AND gate 203 is connected to the input of OR gate 204, and the output of gate 204 is sent to function generator 136 (via line 41) as a delta X strobe. As was previously described, the other output of single shot 198 causes main sequence counter 215 to advance to a count of three by passing through OR gate 243 (FIG. 2E via line 32), and single shot 308 (FIG. 2L via line 90) before advancing counter 215.

AND gate 212 (FIG. 2D) has two inputs, the first input being connected to main sequence counter 215 count of three signal (via line c), and the second input being connected to the op-code 5 signal (the output of OR gate 182). The output of gate 212 is connected to the input of OR gate 232 (FIG. 2E via line 46), and the output of gate 232 is connected to the input of OR gate 221. The output of OR gate 221 is connected to one of the inputs to OR gate 204, and the output of OR gate 214 resets the main sequence counter 215 to a count of one.

New data having an op-code equal to 6 is loaded into FIFO memory 125 and a count equal to two is now on main sequence counter 215. The op-code 6 signal is stored in register 138 and decoded by decoded 162, and then transmitted to OR gate 181 (FIG. 2C via line 69). The output of OR gate 181 is connected to the input of OR gate 193 and the input of AND gate 201 (FIG. 2D via line 39). AND gate 206 (FIG. 2D) has two inputs, one of the inputs being the output of OR gate 193 (FIG. 2C via line 36) and the second input is connected to that line (line b) of decoder 216 that represents a main sequence count of two. The output of gate 206 is connected to OR gate 207, and the output of OR gate 207 is connected to one of the inputs to OR gate 195 (FIG. 2C via line 38). Single shot 198 is fired when it receives the output signal from gate 195. The output of single shot 198 is connected to the second input of AND gate 201 via line 34, and to the input of OR gate 243 (FIG. 2E via line 32). The output of AND gate 201 (FIG. 2D) is connected to OR gate 202, and the output of gate 202 is sent to function generator 136 via line 42 as a delta Y strobe. The output of OR gate 243 (FIG. 2E) is connected to single shot 308 (FIG. 2L via line 90) and the output of single shot 308 is connected to main sequence counter 215 (FIG. 2E via line 81). Upon the firing of single shot 308, there will be a count of three on counter 215.

After function generator 136 (FIG. 2G) receives the delta Y strobe, it sends a signal called a function complete to one of the two inputs of AND gate 239 (FIG. 2E via line 94). The second input to AND gate 239 is connected to that line (line c) of decoder 216 that represents a main sequence count of three. The output of gate 239 is connected to OR gate 242, and the output of OR gate 242 is connected to one of the inputs of OR gate 243. The output of gate 243 is fed to single shot 308 (FIG. 2L via line 90), and the output signal of single shot 308 is transmitted to main sequence counter 215 to advance the counter to a count of four.

During the main sequence count of four, OR gate 193 (FIG. 2C) is enabled by the op-code 4 signal (line 67). The output of gate 193 is connected to one of the two inputs of AND gate 231 (FIG. 2E via line 36), the other input of gate 231 being the main sequence count of four signal via line d. The output of gate 231 goes to OR gate 232, the output of gate 232 going to OR gate 221 and the output of gate 221 going to gate 214 and to counter 215 to reset main sequence counter 215 to a count of one.

Op-codes 5 and 6 are used to specify the end coordinate of a vector relative to a previously defined start point. The start point of the vector described by this instruction pair may be the stored X and Y coordinates, a pair of position X and position Y instructions immediately preceding this instruction pair, or it may be display coordinate resulting from the previous execution of delta X and delta Y instructions (in other words, the construction of a vector string on a head-to-tail basis). The execution of this instruction pair will update the value of the position X and position Y data available to the next instruction.

Figure 2H:
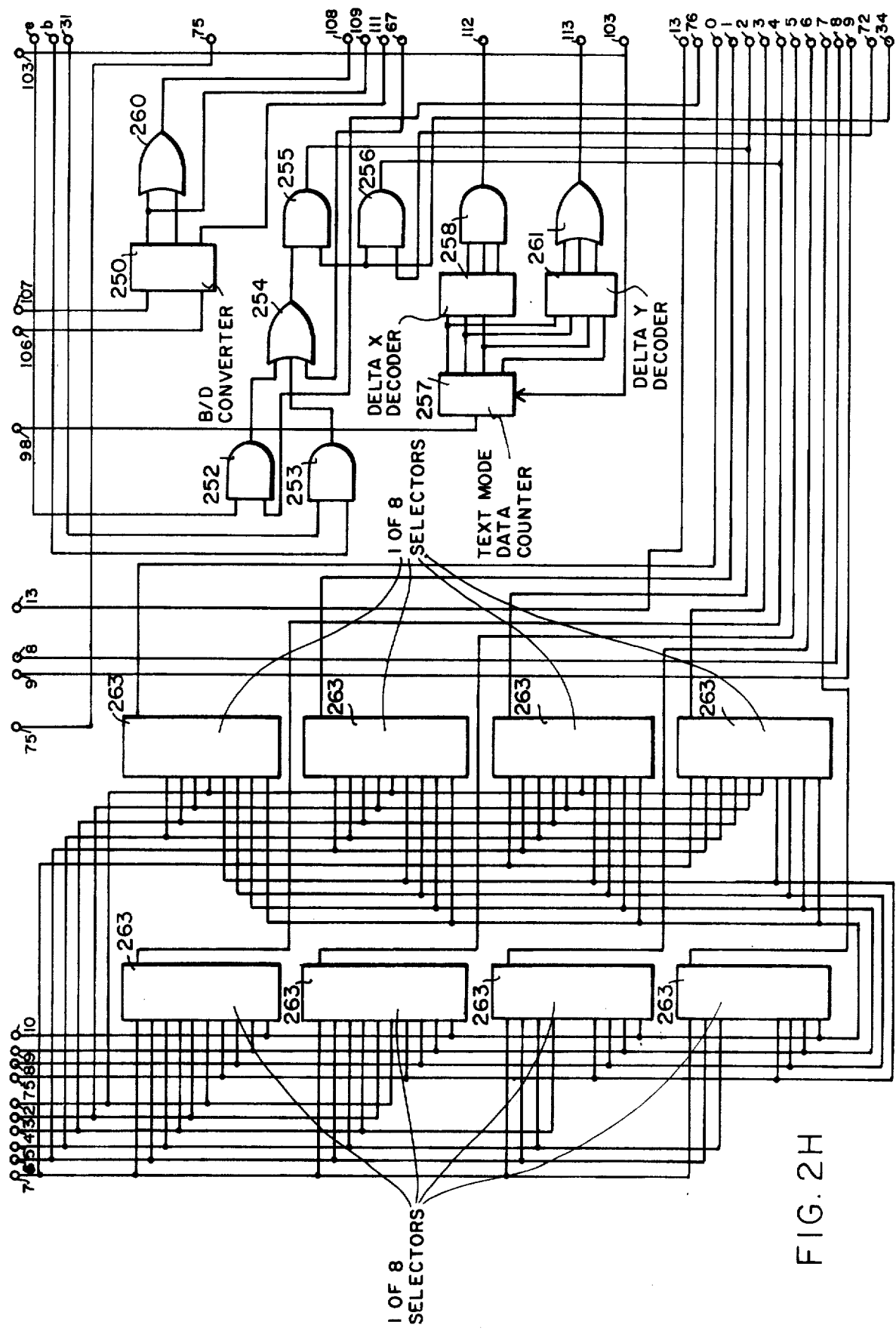
Figure 21:
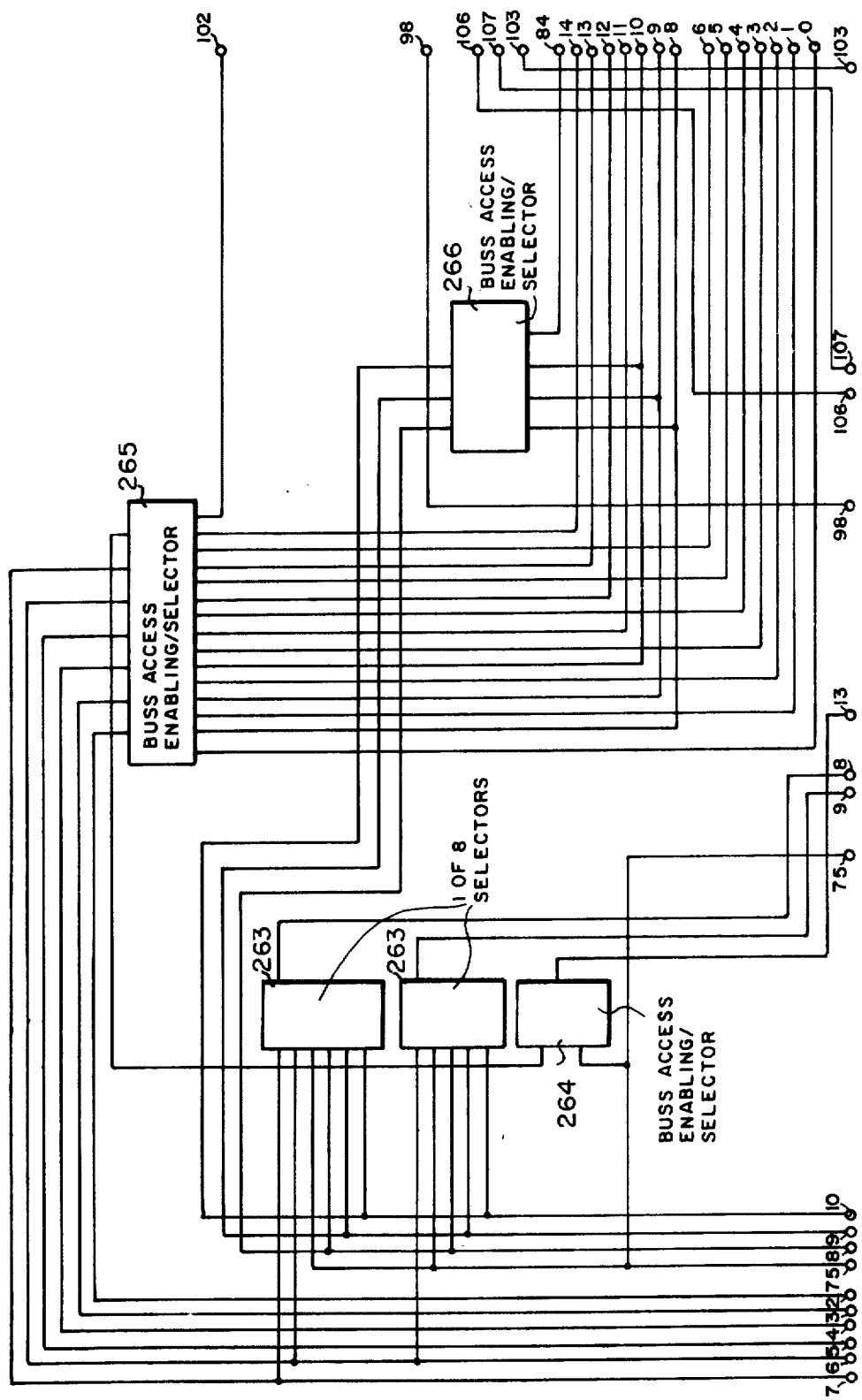
Figure 2J:
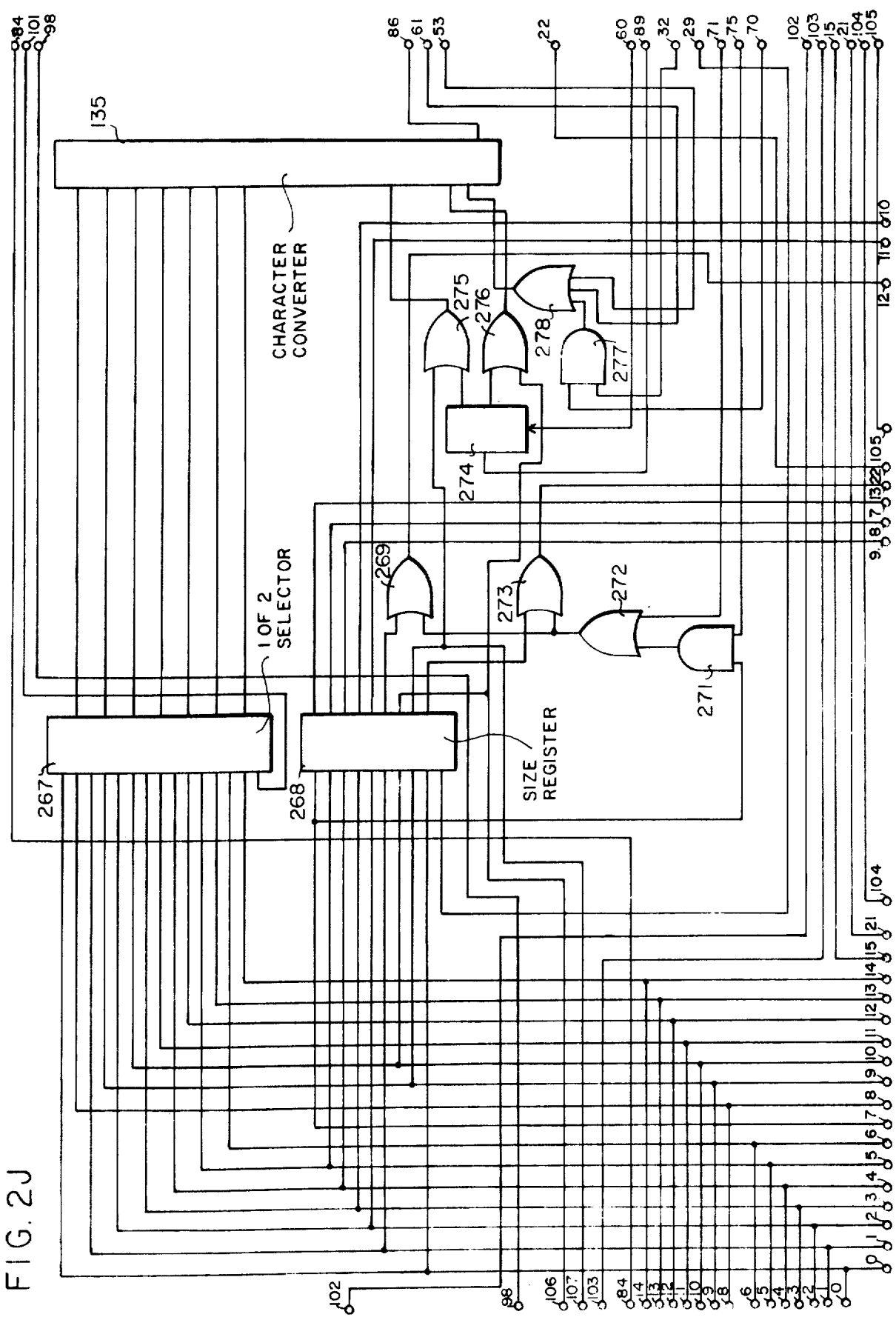

In op-code 7, new data is loaded into FIFO memory 125 and main sequence counter 215 is advanced to a count of two. The op-code 7 signal is stored in register 138 and decoded by decoder 162 before being transmitted to one of the inputs of AND gate 192 (FIG. 2C via line 70). The other input to gate 192 is the main sequence count of two signal via line b. The output of AND gate 192 is connected to one of the inputs to OR gate 306 (FIG. 2L via line 28), and the output of gate 306 is connected to and fires single shot 307. Single shot 307 generates a 500-NS pulse (which acts as a time delay) that fires single shot 309. The output of single shot 309 goes through OR gates 184 (FIG. 2C via line 26), 185 and 195 and fires single shot 198. The output of single shot 198 is connected to AND gate 277 (FIG. 2J via line 32). Gate 277 is enabled by the op-code 7 signal via line 70, and the output of gate 277 is connected to OR gate 278. A signal called a character write strobe is sent to character generator 135 when gate 278 is enabled. A character write strobe causes the character generator 135 to draw a letter on the display devices. As previously described, another output signal of single shot 198 (FIG. 2C) is routed to main sequence counter 215 to advance sequence counter 215 to a count of three.

When character generator 135 (FIG. 2J) is finished drawing the character on a display, a signal called character complete is sent to gate 241 (FIG. 2E via line 86) from generator 135. The other input of gate 241 is connected to the main sequence counter 215 count of three signal (via line c). The output of gate 241 goes through OR gates 242 and 243 to fire single shot 308 (FIG. 2L) which causes the main sequence counter to advance to a count of four.

The main sequence count of four signal is ANDed by AND gate 229 (FIG. 2E via line d) with the op-code 7 signal (via line 70). The output of gate 229 goes through OR gates 232, 221 and 214 to main sequence counter 215 to reset counter 215 to a sequence count of one.

The foregoing has shown that the op-code 7 instruction caused an action to happen in the character generator; that is, it drew the character specified by a character code contained within the word that had an op-code 7 instruction.

A new word is loaded into FIFO memory 125, bringing main sequence counter 215 to a count of two, and the op-code contained in that word is stored in register 138. Decoder 162 decodes the code stored in register 138 which is op-code 8. The op-code 8 signal goes through OR gates 181 (FIG. 2C via line 7) and 193, and the output of gate 193 is connected to one of the two inputs of AND gate 206 (FIG. 2D via line 36). The other input of gate 206 is the main sequence counter 215 count of two signal (via line b). Gate 206 is enabled and its output signal is sent via OR gates 207 and 195 (FIG. 2C via line 38) to fire single shot 198. The output of single shot 198 is connected to one of the two inputs to AND gate 201 (FIG. 2D via line 34), and the other input of gate 201 is the op-code 8 signal which passes through OR gate 181 (FIG. 2C via line 39) before it reaches gate 201. Gate 201 is enabled and its output passes through OR gate 202 before going to function generator 136 (FIG. 2G via line 42) as a delta Y strobe. As previously described, the signal generated by single shot 198 (FIG. 2C) advances the main sequence counter 215 to a count of three. This signal goes through OR gate 243 (FIG. 2E via line 32) and single shot 308 (FIG. 2L) before it causes the advancement of counter 215. The op-code 8 signal is also sent to OR gate 272 (FIG. 2J via line 71), and the output of gate 272 is sent to OR gates 269 and 273. The outputs of gates 269 and 273 are sent to function generator 136 (FIG. 2G via lines 12 and 13) to set the intensity of the function generator to zero.

AND gate 239 (FIG. 2E) has two inputs, one of which is the main sequence count of three signal via line c and the other input is a function complete signal that is transmitted by function generator 136 (FIG. 2G via line 94) after generator 136 has moved the main beam. Gate 239 is enabled and its output signal is transmitted to OR gate 242. The output of gate 242 is connected to OR gate 243, and the output of gate 243 is connected to single shot 308 (FIG. 2L). Single shot 308 is triggered by the signal that is received from gate 243, and the output of single shot 308 causes main sequence counter 215 to advance to a count of four.

AND gate 231 (FIG. 2E) ANDs the op-code 8 signal that went through OR gates 181 and 193 (FIG. 2C) with main sequence counter 215 count of four signal via line d. Gate 231 is enabled and its output is sent to OR gate 232. The output of gate 232 is connected to OR gate 221, and the output of gate 221 goes through OR gate 214 to reset main sequence counter 215 to a count of one.

This instruction (op-code 8) is used to position the main beam by using relative data and by preventing the drawing of a vector on the output device. Thus, the purpose of op-code 8 is to reposition the main beam of the display devices.

A new word is loaded into FIFO memory 125 causing the main sequence counter 215 to advance to a count of two. The op-code 9 code contained in the new word is stored in register 138 and decoded by binary-to-decimal decoder 162. That line of decoder 162 representing an op-code equal to 9 (line 72) is connected to OR gate 193 (FIG. 2C). The output of OR gate 193 is one of the two inputs to AND gate 206 (FIG. 2D via line 36), and the other input to gate 206 is connected to that line of decoder 216 that represents a count of two (line b) on main sequence counter 215. The output of gate 206 is connected to OR gate 207, and the output of gate 207 is connected to OR gate 195 (FIG. 2C via line 38). Single shot 198 is triggered when gate 195 is enabled, and single shot 198 generates a 500-NS strobe signal that is connected to one of the two inputs to AND gate 256 (FIG. 2H via line 34). The other input of AND gate 256 is connected to the op-code 9 signal via line 72 that has been decoded by decoder 162. The output of AND gate 256 is connected to function generator 136 via line 4. When gate 256 is enabled, the signal that is sent to generator 136 causes function generator 136 to draw a circle on the output devices. When single shot 198 (FIG. 2C) was previously triggered by the signal from gate 195, it sent a signal to OR gate 243 (FIG. 2E via line 32). The output of gate 243 is connected to single shot 308 (FIG. 2L via line 90). Single shot 308 generates a signal that is transmitted to main sequence counter 215 and that signal causes counter 215 to advance to a sequence count of three.

AND gate 239 (FIG. 2E) has two inputs, the first input being connected to that line of decoder 216 representing a count of three on sequence counter 215 (line c), and the second input being coupled to function generator 136 function complete signal (via line 94). The output of gate 239 is fed to OR gate 242 and the output of gate 242 enables OR gate 243 to cause single shot 308 to be triggered so that main sequence counter 215 may be advanced to a count of four.

Main sequence counter 215 count of four signal is sent to AND gate 231 (FIG. 2E via line d), and the other input to gate 231 is coupled (via line 36) to the op-code 9 signal that reaches gate 231 by first passing through OR gate 193 (FIG. 2C). The output of gate 231 is connected to OR gate 232, and the output of gate 232 is connected to OR gate 221. The output of gate 221 is coupled to OR gate 214, and the output of gate 214 is connected to and causes main sequence counter 215 to be reset to a count of one so that it may wait for new data to be entered into memory 125.

The op-code 9 instruction draws a circle whose diameter is specified by the lowest seven bits of the instruction. Its center will be the location specified by either the stored values of X and Y or the current values of the position X and position Y parameters.

Op-code 10 is used during text mode and will be the next instruction that is going to be described. In text mode, a position X instruction moves the main beam to the correct X position and the text mode also contain Y data to move the main beam to the correct Y coordinate. An X,Y start position for drawing text on the display screens is now established. By virtue of the fact that this system is in text mode, computer 121 starts sending data to memory 125 that does not have data bit 15 set. Hence, this system remains in op-code 10 until the entire text that the computer wishes on the display screen is drawn. One character is drawn at a time. Then the beam is moved and another character is drawn until all the desired text is written on the screens. Computer time is saved by using the op-code 10 instruction since all the computer has to do is determine the start position for the drawing of text and list the text to be drawn. All other functions, like moving the beam, character size, etc., are performed by this system.

The following portions of of this invention are used for processing op-code 10. New data is loaded into FIFO memory 125 and main sequence counter 215 is advanced to a count of two. Op-code 10 is stored in register 138 and decoded by decoder 162. That line of decoder 162 representing an op-code equal to 10 (line 73) is connected to OR gate 196 (FIG. 2C). The output of OR gate 196 is one of the two inputs to AND gate 197. The other input to AND gate 197 is connected to that line of decoder 216 that represents a main sequence counter count of two (line b). Gate 197 is enabled and its output is connected to one of the inputs to OR gate 185. The output of gate 185 is coupled to one of the inputs to OR gate 195, and the output of gate 195 causes the firing of single shot 198. Single shot 198 generates a 500-NS pulse that will cause counter 215 to advance to a sequence count of three. The signal that causes the above passes through OR gate 243 (FIG. 2E) and single shot 308 (FIG. 2L) before advancing counter 215. The output of gate 196 (FIG. 2C) is also connected via line 31 to the first input to AND gate 253 (FIG. 2H), and the second input to gate 253 is connected to that line of decoder 216 that represents a count of two on main sequence counter 215 (line b). Gate 253 is enabled and its output is coupled to one of the inputs to OR gate 254. AND gate 255 has two inputs, one being the output of OR gate 254 and the other input being connected to the output of single shot 198 (FIG. C via line 34). Gate 255 is enabled and its output is sent to function generator 136 (FIG. 2G via line 2) as a position Y strobe as previously stated. The trailing edge of the 500-NS pulse generated by single shot 198 will advance sequence counter 215 to a count of three. Therefore, gate 255 will only be enabled for 500 NS, i.e., as long as the sequence two signal is present.

This system is now waiting for function generator 136 to send a signal called a function complete (which will be sent when the beam is moved) to one of the two inputs to AND gate 239 (FIG. 2E via line 94). The other input to gate 239 is connected to that line of decoder 216 that represents a main sequence count of three (line c). Gate 239 is enabled, and its output is transmitted to one of the inputs to OR gate 242. The output of OR gate 242 is connected to one of the inputs of OR gate 243, and the output of gate 243 is connected to single shot 308. Single shot 308 is fired and the trailing edge of that signal causes sequence counter 215 to advance to a count of four.

AND gate 235 (FIG. 2E) has two inputs, one of the inputs being connected to that line of decoder 216 that represents a main sequence count of four (line d), and the other input being connected to the output of OR gate 196 (FIG. 2C via line 35). One of the inputs to gate 196 is the op-code 10 signal that is received from decoder 162. Gate 235 (FIG. 2E) is enabled and its output is connected to the input of OR gate 283 (FIG. 2K via line 87). The output of gate 283 is connected to the clock input of text mode sequence counter 284 so that the text mode sequence counter 284 may be set to a count equal to one. The output of gate 235 (FIG. 2E) is also connected to flip flop 288 (FIG. 2K via line 87). Flip flop 288 is a storage flip flop that records the fact that this system is in text mode or special text mode. The output of flip flop 288 is coupled to OR gate 244 (FIG. 2G via line 104) and the output of gate 244 disables tri-state devices 245 and 246 to remove the data coming from the main register 126 from the data buss to the function generator 136. The output of flip flop 288 is also coupled to one of the inputs to OR gate 289, and the output of gate 389 is connected to the enable input of single shot 308 (FIG. 2L via line 91) so that single shot 308 may be triggered during op-code 10. One of the other outputs of flip flop 288 is connected to one of the inputs to AND gate 295. Gate 295 is enabled by the op-code 10 signal via line 73, and the output of gate 295 is connected to the load input of tri-state device 251 (FIG. 2G via line 105) so that the contents of tri-state device 251 may be put on the data buss to the function generator 136.

The size of the characters that are going to be drawn on the screen of the displays are stored in register 268 (FIG. 2J) during op-code 13 (status) which will be described as this description continues. The aforementioned information contains the X,Y character spacing information that is used by this system during op-code 10. Once a starting position is given for the drawing of alphanumeric characters, all of the following alphanumeric characters will be drawn in a straight line. Thus, the Y displacement will always be equal to zero for a given line of alphanumeric characters.

The size of the alphanumeric characters determines the amount of space that must exist between each following character. More space is left between larger characters than smaller characters. Therefore, the X displacement information if a function of character size. Character size information is sent from register 268 via lines 106 and 107 to conversion logic 250 and 260 (FIG. 2H) to convert the character size into an X displacement. This conversion is accomplished via binary-to-decimal converter 250, OR gate 260 and inverter 248 (FIG. 2G).

A text-mode-on signal is also generated by flip flop 288 (FIG. 2K) and transmitted to one of the two inputs of AND gate 292. The other input to AND gate 292 comes from the output of OR gate 291. One of the inputs to OR gate 291 is connected to that line of decoder 216 that represents a main sequence count of four (line d). Thus, AND gate 292 will be enabled when this system has a main sequence count of four and the text-mode-on signal is present at one of the inputs to gate 292. The output of gate 292 is connected to one of the two inputs to OR gate 296, and the output of gate 296 is connected to the clear input of main sequence counter 215 via line 93. Main sequence counter 215 is now sitting at a count of zero (which is off-line) and the text mode sequence counter 284 (FIG. 2K) (which is on-line) is sitting at a count of one. The four outputs of text mode sequence counter 284 are connected to the four inputs of text mode decoder 285.

Text mode sequence counter will stay at a count of one until new data is available from FIFO memory 125. If new data is available from memory 125, a new data ready signal will be sent from memory 125 to flip flop 311 (FIG. 2L via line 21). The output of flip flop 311 is connected to one of the two inputs of AND gate 312 and the other input to gate 312 is connected to that line of text mode decoder 285 (FIG. 2K via line 56) that represents a text mode sequence count of one. Gate 312 is enabled, and its output is connected to one of the inputs of AND gate 313, and to one of the inputs to AND gate 323. The other input to gate 313 is connected to that line of FIFO memory 125 that transmits data bit 15 (line 15). The input of inverter 322 is connected to the data bit 15 line of memory 125 and the output of inverter 322 is connected to the second and final input of gate 323. If data bit 15 is a one, that particular word contains a new op-code and the text mode will be completed. Consequently, AND gate 313 will be enabled and its output will be transmitted to one of the inputs of OR gate 214 (FIG. 2E via line 79). The output of OR gate 214 is connected to main sequence counter 215 and, if enabled, causes counter 215 to be reset to a main sequence count of one. The clear input of text mode sequence counter 284 (FIG. 2K) is connected to that line (via line 92) of decoder 215 that represents a main sequence count of one. Thus, text mode sequence counter 284 will now be at a count of zero.

However, if bit 15 were a zero, that particular word being removed from FIFO memory 125 would not have a new op-code and this system would remain in text mode. Data bit 15 would be changed to a one by passing through inverter 322 (FIG. 2L). Since this system is processing a new data word, a new-data-ready signal will be sent from FIFO memory 125 to flip flop 311. The output of flip flop 311 is one of the two inputs to AND gate 312 and the other input to gate 312 is coupled to the text mode sequence counter count of one signal via line 56. Gate 312 is enabled and its output is connected to one of the two inputs of AND gate 323. The other input to gate 323 is connected to the output of inverter 322. Gate 323 is enabled and its output is coupled to and causes the firing of single shot 325. The output of single shot 325 is connected to one of the inputs to OR gate 321, and the output of gate 321 is connected to one of the two inputs to AND gate 281 (FIG. 2K via line 62). The second input to gate 281 is the op-code 10 signal that has passed through OR gate 196 (FIG. 2C via line 35) and gate 235 (FIG. 2E) (the other input to gate 235 is the main sequence count of four signal via line d) and flip flop 288 (FIG. 2K). Gate 281 (FIG. 2K) is enabled and its output is connected to the input of single shot 282. Since shot 282 is fired and its output advances text mode sequence counter 284 to a count of two. One of the inputs to OR gate 230 (FIG. 2L) is connected to that line (line 55) of decoder 285 that represents a count of two on text mode sequence counter 284. The output of gate 320 is connected to one of the inputs to OR gate 278 (FIG. 2J via line 61). OR gate 278 is enabled and its output signal (character write strobe) is connected to character generator 135 and causes generator 135 to draw the first character contained in the word being processed. When generator 135 finishes drawing the character, it sends a signal called character complete to OR gate 321 (FIG. 2L via line 86). The output of gate 321 is connected to gate 281 (FIG. 2K via line 62) and the output of gate 283 is connected to single shot 282. Single shot 282 is fired and its output causes text mode sequence counter 284 to advance to a count of three. One of the inputs of OR gate 303 is the text mode sequence count of three signal. The output of gate 303 is connected to the input of single shot 304, and the output of single shot 304 is one of the inputs to OR gate 317 (FIG. 2L via line 98). The output of OR gate 317 is connected to one of the two inputs to AND gate 318. Gate 318 has a second input that is the op-code 10 signal that has passed through flip flop 288 (FIG. 2K via line 27). Gate 318 is enabled and its output fires single shot 319. The output of single shot 319 is connected to one of the inputs of AND gate 333. The other input to gate 333 is the text mode sequence count of three signal via line 54. Gate 333 is enabled and its output is connected to one of the inputs to OR gate 335. The output of gate 335 is a signal called a delta X,Y strobe that is coupled to function generator 136 via line 49. The output of single shot 319 is also one of the inputs to OR gate 321. The output of gate 321 is one of the two inputs to AND gate 281 (FIG. 2K via line 62), and the second input to gate 281 is the op-code 10 signal that arrives at gate 281 by passing through OR gate 196 (FIG. 2C via line 35), AND gate 235 (FIG. 2E via line 87) and flip flop 288 (FIG. 2K). Gate 281 is enabled and its output triggers single shot 282 so that text mode sequence counter 284 is advanced to a count of four.

Text mode sequence decoder 285 count of four signal is connected to one of the two inputs of OR gate 286. The output of gate 286 is connected to the select input of one-of-two selector 267 (FIG. 2J via line 101) and the other fourteen inputs to selector 267 are connected to those output lines of main register 126 that carry data bits 0–6 and 8–14. Selector 267 comprises seven OR gates. Each OR gate has two inputs and one output. The first two input lines are connected to the first OR gate, and the next two input lines are connected to the next OR gate, until the last two input lines are connected to the seventh OR gate. Selector 267 has seven outputs, all of which are connected to character generator 135. When gate 286 is enabled, two characters will be sent to character generator 135.

As previously stated, a delta X,Y strobe was generated during the text mode sequence count of three. The generation of a delta X,Y strobe causes function generator 136 to transmit a signal called a function complete to OR gate 321 (FIG. 2L via line 94). The output of gate 321 passes through gate 281 (FIG. 2K via line 62) and single shot 282 and causes text mode sequence counter 284 to advance to a count of five.

One of the inputs of OR gate 286 (FIG. 2L) is connected to that line of decoder 285 that represents a text mode sequence count of five. The output of gate 286 is connected to the select input of one-of-two selector 267 (FIG. 2J via line 101) so that the same data that appeared on the input to character generator 135 in text mode sequence count of four is still present on the inputs to generator 135.

AND gate 337 (FIG. 2L) has two inputs, one of the inputs to gate 337 being the text mode sequence count of five signal (line 57), and the other input being the op-code 10 signal from decoder 162 that has passed through OR gate 196 (FIG. 2C) to AND gate 235 (FIG. 2E via line 35), to flip flop 288 (FIG. 2K via line 87) to AND gate 318 (FIG. 2L via line 27) to single shot 319, and to the second input of gate 337. Gate 337 is enabled and its output is coupled to one of the inputs of OR gate 278 (FIG. 2J via line 53). The output of gate 278 is a signal called a character write strobe. This signal is sent to character generator 135 and causes generator 135 to write the two characters that were placed on the inputs of generator 135 on the screens of the displays.

OR gate 306 (FIG. 2L) has an input coupled to the text mode sequence count of five signal via line 57. The output of gate 306 is connected to the input of single shot 307, and the output of single shot 307 is connected to the input of single shot 309. Single shot 309 is fired and its output is connected to one of the inputs of OR gate 317. The output of gate 317 is connected to one of the two inputs of AND gate 318. The second input to gate 318 is the op-code 10 signal that was decoded by decoder 162 and arrived at the input of gate 318 via OR gate 196 (FIG. 2C), to AND gate 235 (FIG. 2E via line 35) to flip flop 288 (FIG. 2K via line 87). Gate 318 is enabled and its output causes the firing of single shot 319. The output signal of single shot 319 enables OR gate 321 and the output of gate 321 is one of the two inputs of AND gate 281 (FIG. 2K via line 62). The second input to gate 281 is connected to one of the outputs of flip flop 288. Gate 281 is enabled and its output fires single shot 282 which causes text mode sequence counter 284 to advance to a count of six.

One of the inputs to OR gate 303 (FIG. 2K) is connected to that line of decoder 285 that represents a text mode sequence count of six. Gate 303 is enabled and its output causes the firing of single shot 304. The output of single shot 304 enables OR gate 317 (FIG. 2L via line 98) and the output of OR gate 317 enables gate 318. Single shot 319 is fired by the output of gate 318 and the output of gate 318 enables OR gate 321. The output of single shot 319 is also connected to one of the inputs to AND gate 334 and the other input to gate 334 is the text mode sequence count of six signal via line 52. The output of gate 334 is connected to the input of OR gate 335, and the output of gate 335 is a signal called a short vector strobe that is coupled to function generator 136 via line 49. The purpose of the short vector strobe is to move the main beam so the next character may be drawn on the displays. The output of gate 321 enables gate 281 (FIG. 2L via line 62) and the output of gate 281 causes the firing of single shot 282 so that text mode sequence counter 284 may be advanced to a count of seven.

No operation is performed by this system during the text mode sequence count of seven. Therefore, there is no output of decoder 285 for a sequence count of seven. Counter 284 is waiting to be advanced to a sequence count of eight. This will be accomplished when function generator 136 generates a signal called a function complete upon its execution of the short vector strobe that was generated during text mode sequence count of six. The function complete signal enables OR gate 321 (FIG. 2L via line 94), which causes the enabling of gate 281 (FIG. 2K) and the firing of single shot 282 so that the text mode sequence counter 284 may be advanced to a count of eight.

The text mode sequence count of eight signal is decoded by decoder 285 and connected to the input of OR gate 283. The output of OR gate 283 is connected to the input of counter 284 and causes text mode sequence counter 284 to be reset to a sequence count of one.

During op-code 11, new data is loaded into FIFO memory 125 and main sequence counter 215 is advanced to a count of two. Register 138 stores op-code 11 and decoder 162 decodes the information contained in register 138. That line (line 74) of decoder 162 representing an op-code equal to 11 is connected to one of the inputs of OR gate 196 (FIG. 2C). Gate 196 is enabled and its output is connected to one of the two inputs of AND gate 197. The other input of gate 197 is connected to the main sequence count of two signal (line b). Gate 197 is satisfied and its output is connected to one of the inputs to OR gate 185. The output of gate 185 enables OR gate 195, and the output of gate 195 fires single shot 198. The output of gate 196 is also connected to one of the inputs of AND gate 253 (FIG. 2H via line 31), and the second input of gate 253 is connected to that line of decoder 216 that represents a main sequence count of two (line b). Gate 253 is enabled and its output is coupled to one of the inputs of OR gate 254. The output of gate 254 is one of the inputs to AND gate 255. The other input to gate 255 is coupled to the signal generated by single shot 198 (FIG. 2C via line 34). Gate 255 is enabled and its output is sent to function generator 136 (FIG. 2G via line 2) as a position Y strobe. The output of single shot 198 (FIG. 2C) also causes main sequence counter 215 to advance to a count of three. This is accomplished by having the signal generated by single shot 198 enable OR gate 243 (FIG. 2E via line 32) to cause the triggering of single shot 308 (FIG. 2L via line 90) which advances the main sequence counter. This system is now waiting for function generator 136 to send a signal called a function complete (which will be sent when the beam is moved) to one of the two inputs to AND gate 239 (FIG. 2E via line 94). The other input of gate 239 is connected to that line of decoder 216 that represents a main sequence count of three (line c). Gate 239 is enabled and its output is transmitted to one of the inputs of OR gate 242. The output of OR gate 242 is connected to one of the inputs of OR gate 243, and the output of gate 243 is connected to single shot 308 (FIG. 2L via line 90). Single shot 308 is fired and the trailing edge of that signal causes sequence counter 215 to advance to a count of four.

The inputs to AND gate 235 (FIG. 2E) are the op-code 11 signal that has satisfied gate 196 (FIG. 2C via line 32) and the main sequence count of four signal that has been decoded by decoder 216 via line d. Gate 235 is enabled and its output is connected to flip flop 288 (FIG. 2K via line 87). The output of flip flop 288 is connected to one of the inputs to AND gate 294. Gate 294 is enabled by the op-code 11 signal and the output of gate 294 is connected to the load input of tri-state device 247 (FIG. 2G) so that the contents of tri-state device 247 may be put on the data buss to the function generator. The output of flip flop 288 is also coupled to one of the inputs of OR gate 289, and the output of gate 289 is connected to the enable inputs of single shot 308 (FIG. 2L via line 91) so that single shot 308 may be triggered during op-code 11. The output of gate 235 (FIG. 2E) is also connected to one of the inputs of AND gate 236 and the other input to gate 236 is the op-code 11 signal (line 74) that has been decoded by decoder 162. Gate 236 is enabled and its output fires flip flop 274 (FIG. 2J via line 89). The output of flip flop 274 enables OR gates 275 and 276 and causes the jamming of character generator 135 so that only symbols of a predetermined size will be drawn. The output of gate 235 (FIG. 2E) is also connected to one of the inputs of OR gate 283 (FIG. 2K via line 87). The output of gate 283 is connected to the clock input of special text mode sequence counter 284 (counter 284 is also called text mode sequence counter) so that counter 284 may be set to a count equal to one. OR gate 291 is enabled by the main sequence count of four signal via line d and its output is connected to one of the two inputs of AND gate 292. The other input to gate 292 is the op-code 11 signal that has enabled gates 235 (FIG. 2E) and 196 (FIG. 2C) and fired single shot 288 (FIG. 2K). Gate 292 is enabled and its output is connected to one of the inputs of OR gate 296. The output of gate 296 is connected to the clear input of main sequence counter 215 (FIG. 2E via line 93). Main sequence counter 215 is now sitting at zero (which is offline) and the special text mode sequence counter 284 (FIG. 2K) (which is on-line) is sitting at a count of one. The four outputs of special text mode sequence counter 284 are connected to the four inputs of special text mode decoder 285 (also called text mode decoder 285).

Special text mode sequence counter 284 will stay at a count of one until new data is available from FIFO memory 125. If new data is available from memory 125, a new data ready signal will be sent from memory 125 via line 21 to flip flop 311 (FIG. 2L), and the output of flip flop 311 is connected to one of the inputs to AND gate 312 (the other input to gate 312 being the special text code count of one signal via line 56), AND gate 313 and AND gate 313 will be enabled. AND gate 313 will be enabled if data bit 15 is a one and that particular word in memory 125 will contain a new op-code meaning that the special text mode is complete.

The enabling of gate 313 will cause OR gate 214 (FIG. 2E via line 79) to be satisfied so that main sequence counter 215 will be reset to a count of one. The resetting of the main sequence counter causes decoder 215 via line 92 to send a clear signal to special text mode sequence counter 284.

AND gate 323 (FIG. 2L) will be enabled if data bit 15 is a zero. If data bit 15 is a zero, the apparatus of this invention will remain in special text mode. Data bit 15 would be changed to a one by passing through inverter 322. Single shot 325 will be triggered by the output of AND gate 323 and cause OR gate 327 to be satisfied. The output of gate 327 is coupled to the clock input of main register 126. Gate 312 will still be enabled and its output coupled to one of the two inputs to AND gate 323. The other input to gate 323 is connected to the output of inverter 322. The input to inverter 322 is connected to data bit 15 from main register 126. If data bit 15 is a one, that particular word contains a new op-code and the special text mode will be completed. Consequently, AND gate 313 will be enabled and its output will be transmitted to one of the inputs to OR gate 214 (FIG. 2E via line 79). the output of OR gate 214 is connected to main sequence counter 215 and, if enabled, causes counter 215 to be reset to a main sequence count of one. The main sequence count of one signal (line a) satisfies OR gate 332, and the output of gate 332 clears flip flop 274 (FIG. 2J via line 60) to remove the size jam because this system is no longer in special text mode. The clear input of the special text mode sequence counter 284 (FIG. 2K) is connected to that line (line 92) of decoder 215 that represents a main sequence count of one. Thus, special text mode sequence counter 284 will now be at a count of zero.

In this instance we will assume that data bit 15 was a zero so that this system may remain in op-code 11, i.e., special text mode. AND gate 323 (FIG. 2L) will be enabled to cause the firing of single shot 325 so that OR gate 321 may be satisfied, causing the enabling of AND gate 281 (FIG. 2K) via line 62 and the firing of single shot 282 to advance counter 284 to a count of two. The output of single shot 325 also enables OR gate 324, and the output of gate 324 clears flip flop 311. OR gate 320 (FIG. 2L) is coupled to the special text mode count of two signal (via line 55) and the output of gate 320 is connected to one of the inputs to OR gate 278 (FIG. 2J via line 61). Gate 278 is enabled and its output signal is coupled to character generator 135 and causes generator 135 to draw the symbol that is determined by computer 121.

When generator 135 is finished drawing the symbol, generator 135 sends a signal called a character complete to one of the inputs to OR gate 321 (FIG. 2L via line 86). The output of gate 321 is connected to AND gate 281 (FIG. 2K via line 62) and the output of gate 281 is connected to single shot 282. Single shot 282 is fired and its output causes special text mode sequence counter 284 to advance to a count of three.

The special text mode count of three signal is coupled to one of the inputs to OR gate 332 (FIG. 2L via line 54), and the output of gate 332 is coupled to the input of flip flop 274 (FIG. 2J via line 60). Flip flop 274 is fired and causes the enabling of OR gates 275 and 276. The output of OR gate 275 and the output of OR gate 276 are connected to character generator 135. The outputs of gates 275 and 275 will cause generator 135 to remove the character jam that was placed in the system during the main sequence count of four.

One of the inputs to OR gate 303 (FIG. 2K) is connected to the special text mode count of three signal which was decoded by decoder 285. Gate 303 is enabled and causes the firing of single shot 304 and the enabling of OR gate 317 (FIG. 2L via line 98). The output of gate 317 is one of the two inputs to AND gate 318. The other input to gate 318 is the output of flip flop 288 (FIG. 2K via line 27) which stored the fact that this system is in special text mode. Gate 318 is enabled and its output triggers single shot 319. One of the inputs to AND gate 333 is the output of single shot 319. The second input to gate 333 is the special text mode count of three signal (via line 54) that has been decoded by decoder 285. Gate 333 is enabled and its output enables OR gate 335. The output of gate 335 triggers single shot 336 and the output of single shot 336 advances special text mode delta X,Y data counter 257 (FIG. 2H via line 98) to a count of one and selects the next value of X and Y for the next symbol to be drawn on the displays. Data counter 257 advances one new count for each additional symbol that will be drawn on the displays.

Special text mode data counter 257 was previously cleared during the main sequence count of four. This was accomplished by the output of gate 235 (FIG. 2E) that caused the firing of flip flop 288 (FIG. 2K) which recorded that this system is in special text mode. The output of gate 288 was one of the inputs to AND gate 294. The second input (via line 74) to gate 294 is the op-code 11 signal that has been decoded by decoder 162. Gate 294 was enabled and its output cleared counter 257 (FIG. 2H via line 103) and tri-state device 247 (FIG. 2G via line 103).

Three of the outputs of counter 257 (FIG. 2H) are connected to the inputs of delta Y decoder 258 and the four outputs of counter 257 are connected to the inputs of delta X decoder 261. Decoders 258 and 261 decode the position that the main beam of the displays must be moved to in order to draw the next symbol. The outputs of decoders 258 and 261 are connected to the inputs of tri-state device 247 (FIG. 2G) so that the beginning point of the next symbol to be drawn will be put on the data buss to the function generator from the outputs of device 247. Thus, this system automatically calculates the position of the next symbol in order to save the computer's time.

The output of single shot 319 (FIG. 2L) is also one of the inputs to OR gate 321. The output of gate 321 is one of the two inputs to AND gate 281 (FIG. 2K via line 62), and the second input to gate 281 is the op-code 11 signal that arrives at gate 281 by passing through OR gate 196 (FIG. 2C), AND gate 235 (FIG. 2E) and single shot 288 (FIG. 2K). Gate 281 (FIG. 2K) is enabled and its output triggers single shot 282 so that special text mode sequence counter 284 is advanced to a count of four. The count of four signal of the special text mode sequence decoder 285 is connected to one of the two inputs to OR gate 286. The output of gate 286 is connected to the select input of one-of-two selector 267 (FIG. 2J via line 101), and the other fourteen inputs to selector 267 are connected to those lines of main register 126 that transmit data bits 0 through 6 and 8 through 14. Selector 267 has seven outputs, all of which are connected to character generator 135. When gate 286 (FIG. 2K) is enabled, two symbols will be sent to character generator 135.

As previously stated, a delta X,Y strobe was generated during the special text mode sequence count of three. The generation of a delta X,Y strobe causes function generator 136 (FIG. 2G) to transmit a signal via line 94 called a function complete to OR gate 321 (FIG. 2L). The output of gate 321 passes through gate 281 (FIG. 2K) and single shot 282 and causes special text mode sequence counter 284 to advance to a count of four.

One of the inputs to OR gate 286 (FIG. 2K) is connected to that line of decoder 285 that represents a text mode sequence count of five. The output of gate 286 is connected to the select input of one-of-two selector 267 (FIG. 2J via line 101) so that the same data that appeared on the input to character generator 135 in special text mode sequence count of four will still be present on the inputs to generator 135.

AND gate 337 (FIG. 2L) has two inputs, one of the inputs of gate 337 being the special text mode sequence count of five signal (via line 57), and the other input being the op-code 11 signal from decoder 162 that has passed through OR gate 196 (FIG. 2C), AND gate 235 (FIG. 2E), flip flop 288 (FIG. 2K) and single shot 319. Gate 337 is enabled and its output is coupled to one of the inputs to OR gate 278 (FIG. 2J via line 53). The output of gate 278 is a signal called a character write strobe. This signal is sent to character generator 135 and causes generator 135 to write the two symbols that were placed on the inputs of generator 135 on the screen of the displays.

OR gate 306 (FIG. 2L) is also enabled by the special text mode count of five signal via line 57 and its output fires single shot 307. The output of single shot 307 triggers single shot 309 so that OR gate 317 may be satisfied. The output of gate 317 is connected to one of the two inputs to AND gate 318. The second input to gate 318 is the op-code 11 signal that was decoded by decoder 162 and arrived at the input of gate 318 via OR gate 196 (FIG. 2C), AND gate 235 (FIG. 2E) and flip flop 288 (FIG. 2K). Gate 318 is enabled and its output causes the firing of single shot 319. The output signal of single shot 319 enabled OR gate 321, and the output of gate 321 is one of the two inputs to AND gate 281 (FIG. 2K via line 62). The second input to gate 281 is connected to one of the inputs to flip flop 288. Gate 281 is enabled and its output fires single shot 282 which causes special text mode sequence counter 284 to advance to a count of six.

One of the inputs to OR gate 303 (FIG. 2K) is connected to that line of decoder 285 that represents a special text mode sequence count of six. Gate 303 is enabled and its output causes the firing of single shot 304. The output of single shot 304 enables OR gate 317 (FIG. 2L via line 98), and the output of gate 317 enables gate 318. Single shot 319 is fired by the output of gate 318 and enables OR gate 321. AND gate 334 is enabled by the special text mode count of six signal and the output of single shot 319. The output of gate 334 is connected to one of the inputs to OR gate 335, and the output of gate 335 is a signal called a short vector strobe that is coupled to function generator 136 (FIG. 2G via line 49). The purpose of the short vector strobe is to move the main beam of the displays to the position decoded by decoders 258 and 261 (FIG. 2H) to enable the next symbol to be drawn at its proper location. The output of gate 321 (FIG. 2L) enables gate 281 (FIG. 2K), and the output of gate 281 causes the firing of single shot 282 so that the special text mode sequence counter 284 may be advanced to a count of seven.

No operation is performed by this system during the special text mode sequence count of seven. Therefore, decoder 285 has no output during this sequence count. Counter 284 is waiting to be advanced to a sequence count of eight. This will be accomplished when function generator 136 (FIG. 2G) generates a signal (via line 94) called a function complete upon the execution of the short vector strobe of generator 136 that was generated by the special text mode sequence count of six. The function complete signal enables OR gate 321 (FIG. 2L), which causes the enabling of gate 281 (FIG. 2K) and the firing of single shot 282 so that special text mode sequence counter 284 may be advanced to a count of eight.

The text mode sequence count of eight signal is decoded by decoder 285 and connected to the input of OR gate 283. The output of OR gate 283 is connected to the input of counter 284 and causes special text mode sequence counter 284 to reset to a sequence count of one.

As illustrated above, special text mode is used for drawing the symbols and alphanumeric characters that were specified in the data words that were processed by this system. This system will generate the commands necessary to draw the specified symbol centered at the display position specified by the current position X value and the Y coordinate specified in a particular instruction. Therefore, prior to drawing each alphanumeric character, the position X and position Y values will be updated in a manner which will cause the character to be drawn at a location specified by this system.

The next op-code that is going to be described in op-code 12. Op-code 12 is called short vector mode and it is used for drawing vectors of limited length on a relative position basis. The vector length is limited to permit the delta X and delta Y increments specifying the relative displacement of a vector endpoint to be packed into a single word. The command word incorporates a binary scaling factor which is applied to the data in each word prior to the computation of the coordinates of the endpoint specified by the word. This permits a fixed display instruction file to be used to draw a given image (such as a coastline) at different binary magnifications (i.e., range scales) without processing the instruction file each time the magnification factor is changed. When a new magnification factor is selected, it is only necessary to change the scale factor in the display instruction to a value appropriate to the factor selected.

The vectors drawn in this mode may be started at the eight stored values of X and Y or at the position X and position Y values. The following poritions of the apparatus of this invention are used for the processing of an op-code 12 instruction. A word containing an op-code 12 instruction is loaded into FIFO memory 125 from DMA channel 123. The op-code portion of that instruction is stored in register 138 and decoded by decoder 162, and the main sequence counter 215 is advanced to a count of two. The op-code 12 signal from decoder 162 satisfies OR gate 244 (FIG. 2G via line 75) and the output of gate 244 disables tri-state devices 245 and 246 to remove the data coming from main register 126 from the data buss to the function generator 136. The output of flip flop 288 is also coupled to one of the inputs to OR gate 289, and the output of gate 289 is connected to the enabled input of single shot 308 (FIG. 2L via line 91) so that single shot 308 may be triggered during the next op-code 11 instruction. One of the inputs to AND gate 222 (FIG. 2E) is the decoded op-code 12 signal from decoder 162. The other input to gate 222 is connected to that line of decoder 216 that represents a main sequence count of two (line b). Gate 222 is enabled and its output is connected to the load input of register 266 (FIG. 2I via line 84) so that the scaling bits, i.e., data bits 8, 9 and 10, (which may be entered into the computer by a manually controllable switch) may be stored in register 266. Thus, there are eight possible scales that may be used for drawing vectors in short vector mode. As soon as data bits 8, 9 and 10 are stored in register 266, they are immediately imposed upon all the one-of-eight selectors 263. Hence, all the data that follows will then be scaled according to the numeric value of data bits 8, 9 and 10, while the op-code 12 signal is on the inputs to scalers 263 and tri-state device 264. The other input to tri-state device 264 is from selector 265 and the output of tri-state device 264 goes on the data buss to the function generator. The data contained in one-of-eight selectors 263 is scaled by truncating the least significant bit or bits for that particular scaling factor. For instance, for maximum scaling the most significant data bit will be the only data bit that will be used to draw that particular vector. Thus, the scaling of vectors may be accomplished automatically without computer supervision.

The output of gate 222 (FIG. 2E) is also connected to one of the inputs to OR gate 226. The output of gate 226 is connected to one of the inputs to OR gate 303 (FIG. 2K via line 82), and the output of gate 303 is connected to single shot 304. Single shot 304 is fired and its output is connected to the input of single shot 308 (FIG. 2L via line 98) so that main sequence counter 215 (FIG. 2E via line 81) may be advanced to a count of three.

Throughout op-code 12 and for each data word that data bit 7 is a one, AND gate 271 (FIG. 2J) will be enabled and its output will satisfy OR gate 272. The output of gate 272 will enable OR gate 269, and the output of gate 269 will be sent to function generator 136 to cause the matter that is going to be drawn on the screen of the display during this op-code to blink.

AND gate 293 (FIG. 2K) has two inputs, one of which is coupled to the op-code 12 signal from decoder 162 via line 75, and the other input to gate 293 is coupled to the main sequence count of three signal (line c) from decoder 216. Gate 293 is enabled and its output is connected to one of the inputs to OR gate 296. The output of gate 296 is connected via line 93 to the main sequence counter 215 in order to set the main sequence counter to zero which is an off-line state. The output of gate 293 is also connected to one of the inputs to OR gate 297, and the output of gate 297 is connected to the load input of short vector sequence counter 299. Counter 299 is now at a count of one. The inputs to short vector decoder 301 are connected to the outputs of counter 299. AND gate 305 has two inputs, one of which is connected to that line of decoder 301 that represents a short vector sequence count of one and the other input is connected to the output of single shot 311 (FIG. 2L via line 30). Single shot 311 will be fired when the new data ready signal is transmitted by FIFO memory 125 to single shot 311. Thus, the new data ready signal signifies that memory 125 has received new data. If new data is ready, AND gate 305 (FIG. 2K) will be enabled and AND gate 314 and 315 will be used to perform at bit 15 check to determine if the new word contains a new op-code or is a data word. If bit 15 is a one, the new word contains a new op-code. The output of gate 305 (FIG. 2K) is connected to one of the inputs to AND gate 314 (FIG. 2L via line 51), and the output of gate 305 is also connected to one of the inputs to AND gate 315. The second input to AND gate 314 is coupled to the new data ready signal via line 15 and the second input to AND gate 315 is coupled to inverter 316. Inverter 316 is coupled to the new data ready signal. Thus, if bit 15 is a one, AND gate 314 will be enabled and its output will enable OR gate 214 (FIG. 2E via line 88) which will cause main sequence counter 215 to be reset to a count of one. A clear signal is then sent back to short vector sequence counter 299 to clear it and remove this system from short vector mode. However, if bit 15 is a zero, the new word will only contain data and this system will remain in op-code 12. Hence, AND gate 315 (FIG. 2L) will be enabled and its output will fire single shot 326. The output of single shot 326 is connected to one of the inputs to OR gate 327, one of the inputs to OR gate 324, and one of the inputs to OR gate 328. The output of gate 327 is connected to the clock input of main register 126 (via line 119) so that data may be transferred out of memory 125 to main register 126. The output of OR gate 324 is coupled to flip flop 311 so that this flip flop may be cleared. Gate 328 is enabled and its output is connected to one of the inputs to OR gate 329 and the output of gate 329 is connected to one of the inputs to AND gate 331.

As previously mentioned, gate 293 (FIG. 2K) was enabled. This output is connected to the input of flip flop 287. Flip flop 287 stores the fact that this sytem is in short vector mode. The output of flip flop 287 is coupled to OR gate 289 and the output of gate 289 enables single shot 308 (FIG. 2L via line 91) so that single shot 308 may be triggered during op-code 12. The output signal of flip flop 287 is also connected to the second input to AND gate 331 (FIG. 2L via line 59). Gate 331 is enabled and its output is connected to the input of single shot 298 (FIG. 2K via line 97). Single shot 298 is fired and causes short vector sequence counter 299 to advance to a count of two.

Decoder 301 decodes the short vector sequence counter count of two signal. This decoded signal is coupled to one of the inputs to AND gate 338 (FIG. 2L via line 96) and this signal is also coupled to one of the inputs to OR gate 339. The output of gate 339 is connected to the input of single shot 341. Single shot 341 is fired and its output is coupled to the second input of AND gate 338. Gate 338 is enabled and its output is connected to one of the inputs to OR gate 204 (FIG. 2D via line 44). The output of gate 204 is a delta X strobe which loads the lower half of the data word into function generator 136 (FIG. 2G via line 41) as delta X information. The output of gate 328 is connected to one of the inputs to OR gate 329 and the output of gate 329 is connected to one of the two inputs to AND gate 331. AND gate 331 will be enabled since this system is still in short vector mode and the signal generated by single shot 287 (FIG. 2K) will still be present at the other input to gate 331 (FIG. 2L). The output of gate 331 is connected to the input of single shot 298 (FIG. 2K via line 97), and the output of single shot 298 causes short vector sequence counter 299 to advance to a count of three.

Short vector sequence count of three signal is decoded by decoder 301 and this signal is coupled to one of the inputs to OR gate 303. The output of gate 303 is connected to the input of single shot 304, and the output of single shot 304 passes through gates 329 and 331 and single shot 298 (FIG. 2K via line 97) to advance short vector sequence counter 299 to a count of four. The short vector sequence count of three signal and the short vector sequence count of four signal are connected to the inputs to OR gate 302. The output of gate 302 is connected to the strobe input of data selector 265 (FIG. 2I via line 102). The other inputs to selector 265 are connected to the output data lines of main register 126. When the strobe to one-of-two selector 265 is present, the data contained in selector 265 is routed to selectors 263 (FIGS. 2H and 2I) and then placed on the data buss to the function generator 136 (FIG. 2G) properly scaled according to the code stored in selector 151 (FIG. 2B). The upper half of the data word was put on the data buss during the short vector sequence counts of three and four.

The short vector count of four signal passes through gate 302 (FIG. 2K) to the strobe input of selector 265 (FIG. 2I via line 102) and causes selector 265 to send the lower half of the data word to selectors 263 according to the code stored in selector 151 (FIG. 2B). Thus, the data on the data buss will cause the display to automatically draw vectors of a certain specified size upon the display screen.

The short vector count of four signal also passes through OR gate 339 (FIG. 2L via line 95) to cause the firing of single shot 341. The output of single shot 341 is connected to one of the inputs to AND gate 342, and the output of single short 341 is also connected to one of the inputs to OR gate 328. AND gate 342 will be enabled since the short vector count of four signal will be present at the second input to gate 342. This signal will pass through OR gate 202 (FIG. 2D via line 45) before it is sent to function generator 136 (FIG. 2G via line 42) as a delta Y strobe so that delta Y data may be loaded into function generator 136. Short vector sequence counter 299 (FIG. 2K) is advanced to a count of five by the signal generated by single shot 341 (FIG. 2L via line 97). This is accomplished after the signal passes through gates 328, 329 and 331 and single shot 298 (FIG. 2K).

Short vector count of five output from decoder 301 is not used. The reason for this is that this system is waiting for the function complete signal to come back from function generator 136. Generator 136 transmits a function complete signal to one of the inputs of OR gate 328 via line 94. Gate 328 is enabled and this fact causes the enabling of gates 329 and 331 and the firing of single shot 298 (FIG. 2K via line 97) to advance short vector sequence counter 299 to a count of six. The short vector count of six signal is decoded by decoder 301 and coupled to one of the inputs of OR gate 297. Gate 297 is enabled so that counter 299 may be reset to a count of one. This system will remain in short vector mode until the next word in FIFO memory 125 contains a new op-code. When this happens, main sequence counter 215 will be reset to a count of one.

Op-code 13 is used to select the status of the parameters appearing on the displays. Thus, the status instruction will control the intensity of the matter appearing on the displays, the drawing of dotted lines on the displays, the rotating of characters on the displays, the size of the characters that are going to be drawn on the displays, and the blinking of the matter appearing on the displays. The status instruction that is originally specified will remain in effect until a new status instruction is processed by this system.

The following portion of this system will be used during op-code 13. A new word is entered into FIFO memory 125 (causing sequence counter 215 to reach a count of two) and the portion of the word containing an op-code is stored in register 138. Decoder 162 decodes the bits stored in register 138 and determines that it is op-code 13. AND gate 191 (FIG. 2C) is enabled by the main sequence count of two signal (via line b) and the op-code 13 signal (via line 76), and its output is connected to the load input of register 268 (FIG. 2J via line 29). If data bit 7 is a one, the data inputs of register 268 will be sent to the function generator 136 (FIG. 2G). Note those data outputs of register 268 that control the intensity of the matter appearing on the displays will be sent to the function generator 136 via OR gates 269 and 273. The presence of other data on the output of register 268 will be sent to the function generator to cause the rotation of some or all matter appearing on the displays, the blinking of matter appearing on the displays, the drawing of two points on the displays, and the drawing of lines of varying structure on the displays. The outputs of register 268 that determine the size of the characters are sent to character generator 135 via OR gates 275 and 276. Other outputs of register 268 are sent to the character generator 135 to control the rotation of characters appearing on the displays. One of the inputs to OR gate 223 (FIG. 2E) is the line of decoder 162 that represents op-code 13 (line 76). Gate 223 is enabled and its output is connected to one of the inputs to AND gate 224. Gate 224 is enabled by the main sequence count of two signal via line b and its output satisfies OR gate 226. The output signal of gate 226 enables OR gate 303 (FIG. 2K via line 82), and the output of gate 303 fires single shot 304. The output of single shot 304 triggers single shot 308 (FIG. 2L via line 98), causing main sequence counter 215 to advance to a count of three via line 81.

If data bit 8 is a zero, AND gate 209 (FIG. 2D) will be enabled by the following three signals: the main sequence count of three via line c, op-code 13 via line 76, and data bit 8 (line 8) from main register 126 passing through inverter 208. The output of gate 209 satisfies OR gate 213 and the output of gate 213 enables OR gate 221 (FIG. 2E via line 47). The output of gate 221 enables OR gate 214 whose output resets main sequence counter 215 if data bit 8 were a zero.

If data bit 8 is a one, AND gate 237 (FIG. 2E) will be enabled by the following two signals: the op-code 13 via line 76 and the main sequence count of three via line c.

The output of gate 237 satsifies OR gate 194 (FIG. 2C via line 33), and the output of gate 194 enables OR gate 195 to cause the firing of single shot 198. AND gate 249 (FIG. 2G) will be enabled by the data bit 8 being present at one of its inputs, and the op-code 13 signal via line 76 being present at its other input.

The output of gate 249 will clear registers 245 and 246 (via OR gate 244) and remove all the data that is going to function generator 136 so that selector 151 (FIG. 2B) may be loaded with X, Y data stored in registers 148 and 149 and put that data on the data buss going to the function generator. The X data from register 148 is going to be put on the data buss during main sequence counts four and five since at that time OR gate 291 (FIG. 2K) will be enabled by the main sequence count of four via line d or main sequence count of five signals via line e and cause the loading to selector 151 (FIG. 2B via line 22) with X data. When sequence counter 215 does not have a count equal to four or five, selector 151 will select the Y data and put that Y data on the data buss going to function generator 136.

The main sequence count of three signal is connected to one of the inputs to AND gate 183 (FIG. 2C via line c). Gate 183 is enabled by the op-code 13 signal via line 76 that has been decoded by decoder 162. The output of gate 183 satisfies OR gate 186 and the output of gate 186 is one of the two inputs to AND gate 199. The second input to gate 199 is the signal that has previously been generated by single shot 198. Gate 199 is enabled and its output is sent to function generator 136 (FIG. 2G via line 43) as a position X data strobe. The output of single shot 198 also enables OR gate 243 (FIG. 2E via line 32), and the output of gate 243 fires single shot 308 (FIG. 2L via line 90) to cause main sequence counter 215 to advance to a count of four via line 81.

AND gate 225 (FIG. 2E) has two inputs. They are the op-code 13 signal via line 76 as decoded by decoder 162 and the main sequence count of four signal via line d as decoded by decoder 216. Gate 225 is enabled and its output satisfies OR gate 226. The output of gate 226 enables OR gate 303 (FIG. 2K via line 82) causing the triggering of single shot 304. The output of single shot 304 fires single shot 308 (FIG. 2L via line 98) and the output of single shot 308 advances main sequence counter 215 to a count of five (via line 81).

One of the inputs to AND gate 252 (FIG. 2H is the op-code 13 signal via line 76 as decoded by decoder 162. The second input to gate 252 is the main sequence count of five signal via line e as decoded by decoder 216. Gate 252 is enabled and its output satisfies OR gate 254. AND gate 205 (FIG. 2D) is enabled by the main sequence count of five signal via line e and the op-code 13 signal via line 76, and the output of gate 205 satisfies OR gate 207. The output of gate 207 enables OR gate 195 (FIG. 2C via line 38) and the output of gate 195 fires single shot 198. The output of single shot 198 is one of the two inputs to AND gate 255 (FIG. 2H via line 34). AND gate 255 is enabled by the output of OR gate 254. Gate 255 is enabled and a position Y signal is sent to function generator 136 (FIG. 2G via line 2).

The output of single shot 198 also enables OR gate 243 (FIG. 2E via line 32) and the output of gate 243 fires single shot 308 (FIG. 2L via line 90) causing main sequence counter 215 to advance to a count of six via line 81. AND gate 238 (FIG. 2E) is enabled by the main sequence count of six signal via line f and the function complete signal via line 94 sent by function generator 136 signifying that it has repositioned the main beam of the displays to a new X, Y position. Gate 238 is enabled and its output satisfies OR gate 242. The output of gate 242 enables OR gate 243 and the output of gate 243 fires single shot 308 (FIG. 2L via line 90). The output of single shot 308 advances main sequence counter 215 to a count of seven via line 81.

One of the inputs to AND gate 211 (FIG. 2D) is the op-code 13 signal via line 76 as decoded by decoder 162. Gate 211 is enabled by the main sequence count of seven signal via ling g and its output satisfies OR gate 213. The output of gate 213 enables OR gate 221 (FIG. 2E via line 47) and the output of gate 221 enables OR gate 214 to cause main sequence counter 215 to be reset to one.

To insure that this system does not hang up if decoder 162 accidently decodes an op-code equal to 14 or 15, those lines of decoder 162 representing op-codes 14 and 15 are connected to the input of OR gate 217 (FIG. 2E via lines 77 and 78). OR gate 217 is the same gate that the op-code zero or no-op signal was sent to. The output of gate 217 is connected to one of the inputs to AND gate 218. AND gate 218 will not be enabled and this system will do nothing until a valid op-code is subsequently processed by this system.

At this point a summary of the operation of the entire processor would be in order. This invention is a special purpose display processing unit that establishes electrical compatibility between a general purpose computer direct memory access channel and a plurality of cathode ray tubes. The processing unit performs the interfacing function with the computer, decodes the formatted instructions received from the computer and routes the data derived from the instructions to the displays.

Each of the displays may be required to depict different detailed information without greatly increasing the cost of the system by requiring the use of many digital computers. The apparatus of this invention makes it possible to use a single digital computer and put different detailed matter on the screens of a plurality of displays by minimizing the number of instructions the computer must use to put matter on a particular display. Reducing the number of computer instructions saves computer time and permits one computer to do the work that would have been done by many computers.

The above specification has described a new and improved system for displaying matter on a plurality of display devices. It is realized that the above description may indicate to those skilled in the art additional ways in which the principles of this invention may be used without departing from its spirit. It is, therefore, intended that this invention be limited only by the scope of the appended claims.

What is claimed is:

1. An electronic processing system that saves computer software and computer time by receiving instruction and data words from a digital computer that contain information for automatically controlling the appearance at a particular X, Y position of desired graphical conical matter, alphanumeric characters and symbols of predetermined sizes on a plurality of individually addressable stroke writing cathode ray tubes, said processing system comprising:

a. an interface that causes the instruction and data words of a digital computer to be electrically compatible with the remainder of said system so that the instruction and data words may be transferred from said computer;

b. a first-in-first-out instruction and data memory coupled to said interface so said instruction and data words which contain information on X, Y positioning, alphanumeric characters or symbol addressing, alphanumeric character size and conical radius and centering may be entered into said first-in-first-out memory and exit said memory serially in the order said data and instruction words entered said memory;

c. a first register coupled to said memory for temporarily storing at a given time one data word and/or one instruction word when the remainder of said system has completed the processing of the previous instruction and/or data word and is ready to process the next data or instruction word;

d. decoding means coupled to said first register for decoding the instructions stored in said register;

e. sequencing means coupled to said decoding means and said first register for controlled processing of said data word and/or said instruction word; and f. a plurality of writing means for writing various types of conical graphical matter, alphanumeric characters and symbols on respective ones of said plurality of cathode ray tubes in accordance with the information given by said instruction and data words, said means coupled to said plurality of cathode ray tubes, said decoding means and said sequencing means, whereby said system follows the instructions and processes the data transmitted by said computer permitting said computer to process additional information since said computer will have less information to process because said computer will only send instruction and data words to said processing system when said computer wants to change the information and data currently appearng on one or all of said cathode ray tubes.

2. The system defined in claim 1 wherein said means for writing graphical matter is a conical function generator.

3. The system defined in claim 1 wherein said means for writing alphanumeric characters and symbols is a character generator.

4. The system defined in claim 3 further including means for causing the conical graphical matter, alphanumeric characters and symbols to blink on and off.

5. The system defined in claim 3 further including means for causing the alphanumeric characters and symbols to rotate about a fixed axis.

6. The system defined in claim 1 further including means for automatically calculating and moving the main beam of said cathode ray tube relative to an X,Y axis so that spacing for the next alphanumeric character to be written on said cathode ray tube is automatically determined in accordance with the size of the alphanumeric character to be written on the screen.

7. The system defined in claim 6 further including:

a. a second register for storing a portion of the data word which determines the address and size of the next alphanumeric character or symbol to be drawn; and b. a decoder coupled to said second register, said plurality of writing means and said sequencing means for decoding the alphanumeric character size information contained in that portion of said data word stored in said second register and determining the X, Y displacement that said main beam must be moved under the control of said sequencing means before the next alphanumeric character or symbol is drawn.

8. The system defined in claim 1 wherein said decoding means is a binary-to-decimal decoder that decodes the instruction word stored in said first register so that the data words following may be processed through said system by said sequencing means according to the decoded instructions that are contained within the instruction word.

9. The system defined in claim 16 wherein each instruction word contains an address so data words associated therewith may only be sent to one of said addressable cathode ray tubes, thereby permitting each said cathode ray tube to function independently of the others.

10. The system defined in claim 1 further including scaling means for writing straight lines of various sizes on said cathode ray tubes.

11. The system defined in claim 10 wherein said scaling means comprises:

a. a plurality of selectors, each of said selectors having a different bit of the data word comprising its input and its output being coupled to said means for writing; and b. a manually controllable switch coupled to each of said selectors for controlling the magnitude of the line output of said selectors.

12. The system defined in claim 1 wherein said sequencing means comprises:

a. a plurality of sequence counters that advance to the next highest count upon the completion of a step in the processing of the instruction word and data word;

b. a plurality of decoders, each one of said decoders being coupled to a different one of said sequence counters for decoding the signal produced by said sequence counters;

c. a plurality of single shots coupled to said sequence counters and said decoders for controlling the length of time that a sequence counter will remain in a specific count; and d. a plurality of delays coupled to said sequence counters, said decoders and said single shots for causing said sequence counter to remain in a particular count until said plurality of writing means have completed the processing of a step of said instruction word or data word.

* * * * *

UNITED STATES PATENT AND TRADEMARK OFFICE
CERTIFICATE OF CORRECTION

PATENT NO. : 4,120,028

DATED : October 10, 1978

INVENTOR(S) : Robert J. Membrino et al.

It is certified that error appears in the above—identified patent and that said Letters Patent is hereby corrected as shown below:

Column 32, line 19, "claim 16" should read -- claim 1 --.

Signed and Sealed this

First Day of April 1980

[SEAL]

Attest:

SIDNEY A. DIAMOND

Attesting Officer

Commissioner of Patents and Trademarks